United States Patent
Takenouchi et al.

(10) Patent No.: US 9,738,748 B2
(45) Date of Patent: Aug. 22, 2017

(54) URETHANE OLIGOMER AND ACTIVE ENERGY RAY CURABLE RESIN COMPOSITION CONTAINING SAME

(71) Applicant: KJ CHEMICALS CORPORATION, Tokyo (JP)

(72) Inventors: Miki Takenouchi, Kumamoto (JP); Yusuke Adachi, Kumamoto (JP); Meiri Hirata, Tokyo (JP)

(73) Assignee: KJ Chemicals Corporation, Tokyo (JP)

(*) Notice: Subject to any disclaimer, the term of this patent is extended or adjusted under 35 U.S.C. 154(b) by 0 days.

(21) Appl. No.: 15/125,892

(22) PCT Filed: Mar. 11, 2015

(86) PCT No.: PCT/JP2015/057124
§ 371 (c)(1),
(2) Date: Sep. 13, 2016

(87) PCT Pub. No.: WO2015/141537
PCT Pub. Date: Sep. 24, 2015

(65) Prior Publication Data
US 2017/0009001 A1    Jan. 12, 2017

(30) Foreign Application Priority Data

| | | |
|---|---|---|
| Mar. 17, 2014 | (JP) | 2014-053782 |
| Mar. 18, 2014 | (JP) | 2014-055342 |
| Jan. 9, 2015 | (JP) | 2015-003381 |
| Feb. 10, 2015 | (JP) | 2015-023927 |

(51) Int. Cl.

| | |
|---|---|
| C08G 18/08 | (2006.01) |
| B22F 1/00 | (2006.01) |
| C08G 61/04 | (2006.01) |
| C08G 18/67 | (2006.01) |
| C08F 299/06 | (2006.01) |
| G02B 1/04 | (2006.01) |
| C09D 175/16 | (2006.01) |
| C08F 290/06 | (2006.01) |
| C08G 18/10 | (2006.01) |
| C08G 18/75 | (2006.01) |
| C09D 11/102 | (2014.01) |
| C09D 11/30 | (2014.01) |
| C09J 175/16 | (2006.01) |
| C08G 18/48 | (2006.01) |

(Continued)

(52) U.S. Cl.
CPC ........ *C08G 18/672* (2013.01); *C08F 290/067* (2013.01); *C08F 299/06* (2013.01); *C08G 18/10* (2013.01); *C08G 18/4018* (2013.01); *C08G 18/44* (2013.01); *C08G 18/4825* (2013.01); *C08G 18/6208* (2013.01); *C08G 18/678* (2013.01); *C08G 18/69* (2013.01); *C08G 18/698* (2013.01); *C08G 18/73* (2013.01); *C08G 18/755* (2013.01); *C09D 11/102* (2013.01); *C09D 11/30* (2013.01); *C09D 175/16* (2013.01); *C09J 175/16* (2013.01); *G02B 1/04* (2013.01)

(58) Field of Classification Search
CPC .... C08G 18/672; C08G 18/10; C08G 18/755; C08G 18/44; C08G 18/4018; C08G 18/69; C08G 18/6208; C08G 18/73; C08G 18/698; C08G 18/678; C08G 18/4825; C08G 18/62; C09J 175/16; C09D 11/30; C09D 175/16; C09D 11/102; G02B 1/04; C08F 290/067; C08F 299/06; C08F 220/52; C08F 220/18; C08F 222/20; C08L 75/04; C08L 33/26
USPC ......................................... 524/589, 1; 520/1
See application file for complete search history.

(56) References Cited

FOREIGN PATENT DOCUMENTS

| | | |
|---|---|---|
| EP | 1 162 218 | 12/2001 |
| JP | 48-037495 | 6/1973 |

(Continued)

OTHER PUBLICATIONS

Okidaka et al, JP 2002-037849 Machine Translation, Feb. 6, 2002.*

(Continued)

*Primary Examiner* — Jessica E Whiteley
(74) *Attorney, Agent, or Firm* — Hamre, Schumann, Mueller & Larson, P.C.

(57) ABSTRACT

[Problem]
An problem of the present invention is to provide to a (meth)acrylamide-based urethane oligomer which has excellent compatibility with organic solvents, general purpose acrylic monomers and oligomers, and a high curing speed to active energy rays, and to provide an active energy ray curable resin composition which contains the urethane oligomer, has excellent adhesion, moisture resistance and surface curability, and has low curing shrinkage, and a formed product thereof
[Means for Solution]
By using a (meth)acrylamide-based urethane oligomer of the present invention which has a carbonate skeleton, a diene-based skeleton or a hydrogenated diene-based skeleton in the molecule, one or more (meth)acrylamide groups and a component having a molecular weight of less than 1,000 (excluding a (meth)acrylamide compound (A) having a hydroxyl group) at a content of 5% by weight or less, it is possible to obtain a urethane oligomer which has excellent compatibility with organic solvents, general purpose acrylic monomers and oligomers, and a high curability and to obtain an active energy ray curable resin composition which contains the urethane oligomer and has excellent adhesion, tack resistance, moisture resistance and shrinkage resistance.

14 Claims, No Drawings

(51) Int. Cl.
*C08G 18/62* (2006.01)
*C08G 18/69* (2006.01)
*C08G 18/73* (2006.01)
*C08G 18/40* (2006.01)
*C08G 18/44* (2006.01)

(56) References Cited

FOREIGN PATENT DOCUMENTS

| JP | 61-021120 | | 1/1986 |
| JP | 63-029701 | | 2/1988 |
| JP | 6-145276 | | 5/1994 |
| JP | 8-092342 | | 4/1996 |
| JP | 2002-037849 | * | 2/2002 |
| JP | 2002-371101 | | 12/2002 |
| JP | 2003-165965 | | 6/2003 |
| JP | 2004-155893 | | 6/2004 |
| JP | 2008-045032 | * | 2/2008 |
| JP | 2009-04665 | * | 3/2009 |
| JP | 2009-046605 | | 3/2009 |
| JP | 2009-244460 | | 10/2009 |
| JP | 2010-059343 | | 3/2010 |
| JP | 2010-128417 | | 6/2010 |
| JP | 2010-267703 | | 11/2010 |
| JP | 2011-186139 | | 9/2011 |
| JP | 2013-028675 | | 2/2013 |
| JP | 2013-035920 | | 2/2013 |
| JP | 2013-091575 | | 5/2013 |
| JP | 2015-145437 | | 8/2015 |
| WO | 2007/139157 | | 12/2007 |
| WO | 2013/088889 | | 6/2013 |

OTHER PUBLICATIONS

Uchida et al, JP 2008-045032 Machine Translation, Feb. 28, 2008.*
Kidokoro, JP 2009-046605 Machine Translation, Mar. 5, 2009.*
International Search Report issued in PCT/JP2015/057124, Jun. 9, 2015, 2 pages.
Office Action issued in Japanese Application No. 2015-547581, Feb. 24, 2016, 4 pages with translation.

* cited by examiner

US 9,738,748 B2

URETHANE OLIGOMER AND ACTIVE ENERGY RAY CURABLE RESIN COMPOSITION CONTAINING SAME

TECHNICAL FIELD

The present invention relates to a (meth)acrylamide-based urethane oligomer which has excellent compatibility with organic solvents, general purpose acrylic monomers and oligomers, and a high curing speed when irradiated with active energy rays, and relates to an active energy ray curable resin composition which contains the urethane oligomer, has excellent adhesion, moisture resistance, and surface curability, and has low curing shrinkage, high transparency, and high elongation, and a formed product thereof.

BACKGROUND ART

Urethane acrylate is widely used in coating, inks, pressure sensitive adhesives, adhesives or the like as an ultraviolet ray (UV) curable resin composition. Among these, by having a polybutadiene or polycarbonate skeleton, adhesion, water resistance, chemical resistance, flexibility, elasticity and toughness are imparted, and in recent years, extensive studies have been performed even in the fields of optical members, electronic materials and semiconductors. Typically, such a urethane acrylate is synthesized by reacting a polybutadiene polyol or a polycarbonate polyol with a polyisocyanate to obtain a polyurethane having hydroxyl groups or isocyanate groups at both terminals and by further reacting with hydroxyl group-containing acrylate or isocyanate group-containing acrylate (Patent Documents 1 to 7). In addition, a synthetic method in which hydroxyl group-containing acrylate and a polyisocyanate are reacted, and then, the product is attached to the terminals of a polyol having a polybutadiene skeleton or a polycarbonate skeleton is also proposed (Patent Documents 8 and 9).

However, in these urethane acrylates having a polybutadiene skeleton or a polycarbonate skeleton, the glass transition temperature (Tg) is lower than room temperature in many cases, and when applying the resin composition to a substrate and curing by irradiation with active energy rays such as ultraviolet rays, there were disadvantages that stickiness remains on the surface of the coating film, and it is difficult to become tack-free. To solve the residual stickiness, using in combination with a monofunctional or polyfunctional acrylic monomer or a photosensitizer has been reported. For example, Patent Document 1 proposes a photocurable type resin composition obtained by blending 20% to 80% of a monofunctional acrylate and 2% of a sensitizer, and in Patent Document 2, a modified acrylate-based urethane prepolymer is synthesized from trimethylol propane, and this is mixed with a monofunctional acrylate to be used. Since urethane acrylate having a polybutadiene skeleton or a polycarbonate skeleton has strong hydrophobicity, there were problems in which solubility in many acrylic monomers is insufficient, and flexibility by use of polyfunctional acrylate deteriorates. Furthermore, since the acrylate group of the urethane acrylate resin has an ester structure, hydrolysis is likely to occur, moisture resistance, water resistance, durability, and the like are poor, and the curing speed when irradiated with active energy rays is also low.

To improve active energy ray curability of urethane acrylate, a urethane acrylamide oligomer has been proposed (Patent Document 11). By changing the polymerizable group from an acrylate group to an acrylamide group, ultraviolet ray curability was improved and the stickiness of a cured film surface was improved, but there was no mention of the solubility in a general-purpose organic solvent and an acrylic monomer or the transparency of the obtained cured film.

In Patent Document 8, one serious disadvantage of urethane acrylate having a polybutadiene skeleton was pointed out. This is that cloudiness is likely to occur before and after UV curing. In a case where cloudiness occured, urethane acrylate was not applicable to an optical member requiring transparency, and light transmittance was low, and thus, UV did not reach up to the inside of a resin, and curing was insufficient in some cases. As an improvement plan of the patent document, an urethanization reaction by a tin-based catalyst was mentioned, but a risk of causing deterioration of long-term storage stability, corrosion in the case of being used in an electrical equipment or a short circuit, by the remaining catalyst was newly generated.

On the other hand, in Patent Document 5, a pressure sensitive adhesive for optical members is proposed, and in Patent Document 6, urethane acrylate having a carbonate skeleton as a UV-curable type resin composition used in semiconductor elements or liquid crystal display devices was proposed. These patent documents paid attention to the heat resistance and the moisture resistance of the polycarbonate skeleton, and provided a composition that can cope with a high temperature and high humidity environment, but there was no mention of transparency essential to an optical member or the like, staining properties to the substrate of a protective film having a pressure sensitive adhesive, or the like.

Patent Document 7 proposed a method of irradiating in two stages in which a laminate of a photocurable resin formed of urethane acrylate having a polybutadiene skeleton and (meth)acryl-based monomer is produced, then, the laminate is irradiated with black light at an irradiation amount of 10 to 300 mJ/cm$^2$, and further irradiated with active energy rays at an irradiation amount of 500 to 5,000 mJ/cm$^2$. Patent Document 10 adopts a UV curing method of the same two stage irradiation with respect to urethane acrylate having a polycarbonate skeleton. This method had objects to reduce the residual monomer after photocuring by slowly curing, to improve curability, to prevent curing shrinkage, and to make distortion between the coating film and the substrate difficult to occur. However, since this method causes complication of step by two stage irradiation and increase in cost of the product, this method is not preferable.

RELATED ART

Patent Document

[Patent Document 1] JP-A-S61-21120
[Patent Document 2] JP-A-H06-145276
[Patent Document 3] JP-A-2009-046605
[Patent Document 4] JP-A-2010-267703
[Patent Document 5] JP-A-2013-035920
[Patent Document 6] JP-A-2013-028675
[Patent Document 7] WO 2013/088889
[Patent Document 8] JP-A-2002-371101
[Patent Document 9] JP-A-H08-092342
[Patent Document 10] JP-A-2004-155893
[Patent Document 11] JP-A-2002-37849

DISCLOSURE OF INVENTION

Problems to Be Solved by the Invention

An object of the present invention is to provide a (meth)acrylamide-based urethane oligomer which has excellent compatibility with organic solvents, general purpose acrylic monomers and oligomers, and a high curing speed when irradiated with active energy rays, and to provide an active energy ray curable resin composition which contains the urethane oligomer, has excellent adhesion, moisture resistance, chemical resistance and surface curability, and has low curing shrinkage, high transparency and high elongation, and a formed product thereof.

Means for Solving the Problems

As a result of comprehensive studies for solving the above problems, the present inventors found that by using a polybutadiene-based and/or polycarbonate-based urethane oligomer having one or more (meth)acrylamide groups on the terminal in which the content of a component having a molecular weight of less than 1,000 (excluding a (meth)acrylamide compound having a hydroxyl group) is 5% by weight or less, the above-described object can be achieved, and completed the invention.

That is, the present invention provides the followings.

[1] A (meth)acrylamide-based urethane oligomer, which has:

one type or two or more types of skeletons selected from a carbonate skeleton, a diene-based skeleton and a hydrogenated diene-based skeleton in the molecule; and one or more (meth)acrylamide groups, the oligomer comprising:

a component having a molecular weight of less than 1,000 (excluding a (meth)acrylamide compound (A) having a hydroxyl group) at a content of 5% by weight or less.

[2] The (meth)acrylamide-based urethane oligomer according to [1], wherein the component having a molecular weight of less than 1,000 (excluding a (meth)acrylamide compound (A) having a hydroxyl group) is a urethane adduct compound obtainable by an addition reaction between an isocyanate monomer (B) having two or more isocyanate groups in one molecule and the (meth)acrylamide compound (A) having a hydroxyl group.

[3] The (meth)acrylamide-based urethane oligomer according to [1] or [2], wherein the diene-based skeleton or the hydrogenated diene-based skeleton is one or more types of skeletons selected from the group consisting of polybutadiene, hydrogenated products of polybutadiene, polyisoprene and hydrogenated products of polyisoprene.

[4] The (meth)acrylamide-based urethane oligomer according to any one of [1] to [3], which is obtainable by an addition reaction between a compound (A) represented by Formula [1] ($R_1$ represents a hydrogen atom or a methyl group, $R_2$ and $R_3$ are the same as or different from each other and each represent a hydrogen atom or an alkyl group having 1 to 3 carbon atoms which may be substituted with a hydroxyl group, provided that a case where $R_2$ and $R_3$ are hydrogen atoms at the same time and a case where $R_2$ and $R_3$ are alkyl groups at the same time are excluded) and a compound (C) having one or more isocyanate groups and one or two or more types of skeletons selected from a polycarbonate skeleton, a polybutadiene skeleton, a hydrogenated polybutadiene skeleton, a polyisoprene skeleton and a hydrogenated polyisoprene skeleton in one molecule:

[Chem. 1]

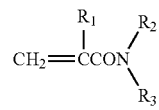

Formula (I)

[5] The (meth)acrylamide-based urethane oligomer according to any one of [1] to [4], wherein the compound (A) is an N-hydroxyalkylene (meth)acrylamide, an N,N-dihydroxyalkylene (meth)acrylamide or an N-alkyl-N-hydroxyalkylene (meth)acrylamide.

[6] An active energy ray curable resin composition, comprising:

the (meth)acrylamide-based urethane oligomer according to any one of [1] to [5].

[7] An active energy ray curable resin composition for optical materials, comprising:

1% by weight or greater of the (meth)acrylamide-based urethane oligomer according to any one of [1] to [5].

[8] An active energy ray curable pressure sensitive adhesive composition, comprising:

1% by weight or greater of the (meth)acrylamide-based urethane oligomer according to any one of [1] to [5].

[9] An active energy ray curable adhesive composition, comprising:

1% by weight or greater of the (meth)acrylamide-based urethane oligomer according to any one of [1] to [5].

[10] An active energy ray curable adhesive composition for optical members, comprising:

1% by weight or greater of the (meth)acrylamide-based urethane oligomer according to any one of [1] to [5].

[11] An active energy ray curable adhesive composition for polarizing plates, comprising:

1% by weight or greater of the (meth)acrylamide-based urethane oligomer according to any one of [1] to [5].

[12] An active energy ray curable sealant composition for electronic parts, comprising:

1% by weight or greater of the (meth)acrylamide-based urethane oligomer according to any one of [1] to [5].

[13] An active energy ray curable coating agent composition, comprising:

1% by weight or greater of the (meth)acrylamide-based urethane oligomer according to any one of [1] to [5].

[14] An active energy ray curable ink jet ink composition, comprising:

1% by weight or greater of the (meth)acrylamide-based urethane oligomer according to any one of [1] to [5].

[15] An active energy ray curable resin composition for three-dimensional modeling, comprising:

1% by weight or greater of the (meth)acrylamide-based urethane oligomer according to any one of [1] to [5].

Effects of the Invention

According to the present invention, it is possible to provide a urethane oligomer which has excellent compatibility with organic solvents, general purpose acrylic monomers and oligomers, and a high curing speed when irradiated with active energy rays by suppressing the content of a component which has a molecular weight of less than 1,000, excluding a (meth)acrylamide compound having a hydroxyl group, to be 5% by weight or less in the oligomer which has a diene-based skeleton, a hydrogenated diene-based skeleton and/or a polycarbonate skeleton in the molecule, and one or more (meth)acrylamide groups. By using a (meth)acrylamide-based urethane oligomer of the present invention, it is possible to provide an active energy ray curable resin composition which has excellent adhesion, moisture resistance, chemical resistance and surface curability, and has low curing shrinkage, high transparency and high elongation, and a formed product thereof.

EMBODIMENTS OF CARRYING OUT THE INVENTION

Hereinafter, the present invention will be described in detail.

The (meth)acrylamide-based urethane oligomer of the present invention has one type or two or more types of skeletons selected from polycarbonate, polybutadiene and hydrogenated polybutadiene in the molecule as an essential component and one or more (meth)acrylamide groups and contains 5% by weight or less of a component having a molecular weight of less than 1,000, excluding a (meth)acrylamide compound having a hydroxyl group.

Excluding the (meth)acrylamide compound having a hydroxyl group in the (meth)acrylamide-based urethane oligomer of the present invention, the content of a component having a molecular weight of less than 1,000 is 5% by weight or less. Here, the component having a molecular weight of less than 1,000 refers to a component having a molecular weight smaller than 1,000, and is mainly a urethane adduct compound obtainable by an addition reaction between an isocyanate monomer (B) having two or more isocyanate groups in one molecule and a (meth)acrylamide compound (A) having a hydroxyl group, and, hereinafter, the component is abbreviated as the low molecular weight component. The present inventors think that usually several to several tens % by weight of the low molecular weight component is contained in the urethane oligomer, the presence thereof causes solubility reduction of urethane oligomers, an occurrence of cloudiness or stickiness remaining after curing with active energy rays. Accordingly, by suppressing the content of the low molecular weight component to be 5% by weight or less, it is possible to solve the various problems described above.

The diene-based skeleton or the hydrogenated diene-based skeleton used in the urethane oligomer of the present invention is one type or two or more types of skeletons selected from the group consisting of polybutadiene, polyisoprene, hydrogenated products of polybutadiene and hydrogenated products of polyisoprene.

The (meth)acrylamide group used in the (meth)acrylamide-based urethane oligomer of the present invention is one type or two types of polymerizable groups selected from methacrylamide groups and acrylamide groups.

The synthetic method of the (meth)acrylamide-based urethane oligomer of the present invention is not particularly limited, and the (meth)acrylamide-based urethane oligomer can be synthesized by a known urethanization reaction technique. That is, the (meth)acrylamide-based urethane oligomer can be synthesized by a reaction of a monofunctional or polyfunctional alcohol (hereinafter, abbreviated as polyol) having one type or two or more types of skeletons selected from a polycarbonate skeleton, a polybutadiene skeleton, a hydrogenated polybutadiene skeleton, a polyisoprene skeleton and a hydrogenated polyisoprene skeleton, an isocyanate monomer (B) having two or more isocyanate groups in one molecule, and a (meth)acrylamide compound (A) having a hydroxyl group. In addition, from the viewpoint of further reducing the content of a low molecular weight component, a method in which, first, by reacting a polyol with (B), a compound (C) having one or more isocyanate groups in the molecule is synthesized, and then, by reacting (C) and (A), a target (meth)acrylamide-based urethane oligomer is obtained is preferable.

The compound (C) of the present invention is an addition reaction product of the polyol with (B). When obtaining the compound (C), a reaction is preferably performed such that the total of the isocyanate groups becomes equivalent or more with respect to the total of hydroxyl groups in the compound having a hydroxyl group capable of reacting with an isocyanate group, and a method in which a reaction is performed such that the equivalent ratio (molar ratio) (hydroxyl group/isocyanate group) becomes 1/1 to 1/2.5 is more preferable.

The polybutadiene-based polyol has a main chain skeleton selected from the group consisting of polybutadiene, hydrogenated products of polybutadiene, polyisoprene, and hydrogenated products of polyisoprene, and has one or more hydroxyl groups on the terminal of the main chain or on the side chain. In addition, from the viewpoint of industrially easy availability and ease of handling, a liquid polybutadiene-based polyol having hydroxyl groups at both terminals including a 1,4-vinyl bond and/or a 1,2-vinyl bond in the molecule or including a hydrogenated product of these vinyl groups is preferable. Examples thereof include diols having a polybutadiene skeleton such as G-1000, G-2000 and G-3000 of NISSO-PB series (manufactured by Nippon Soda Co., Ltd.), R-15HT and R-45HT of Poly bd series (manufactured by Idemitsu Kosan Co., Ltd.), and LBH2000, LBH-P2000, LBH-3000 and LBH-P3000 of Krasol series (manufactured b Cray Valley), and examples of the hydrogenated product of polybutadiene include diols having a hydrogenated polybutadiene skeleton such as GI-1000, GI-2000 and GI-3000 of NISSO-PB series (manufactured by Nippon Soda Co., Ltd.) and HLBH-P2000 and HLBH-P3000 of Krasol series (manufactured b Cray Valley). Examples of the polyisoprene having hydroxyl groups at both terminals include Poly ip (manufactured by Idemitsu Kosan Co., Ltd.). Examples of the hydrogenated product of polyisoprene having hydroxyl groups at both terminals include EPOL (manufactured by Idemitsu Kosan Co., Ltd.). These polybutadiene-based polyols can be used alone or in combination of two or more types thereof.

The polycarbonate-based polyol is obtainable by a transesterification reaction of diols with carbonic acid ester as raw materials, has a main chain skeleton formed of a carbonate group, and has one or more hydroxyl groups on the terminal of the main chain or on the side chain. In addition, from the viewpoint of industrially easy availability and ease of handling, a liquid polycarbonate-based polyol having a carbonate skeleton in the molecule and hydroxyl groups at both terminals is preferable. Examples thereof include Placcel CD series (manufactured by Daicel Chemical Industries, Ltd.), ETERNACOLL UH, UHC, UC, and UM series (manufactured by Ube Industries, Ltd.), DURANOL series (manufactured by Asahi Kasei Chemicals Corp.), NIPPOLLAN 982R (manufactured by Nippon Polyurethane Industry Co., Ltd.), and Kuraray polyol series (manufactured by KURARAY Co., Ltd.). These polycarbonate-based polyols can be used alone or in combination of two or more types thereof.

In addition, one type or two or more types of polyols selected from the group consisting of these polybutadiene-based polyols and polycarbonate-based polyols can be used in arbitrary combination with polyols having other skeletons such as polyethers or polyesters.

Examples of the isocyanate monomers (B) having two or more isocyanate groups in one molecule include aliphatic isocyanates such as hexamethylene diisocyanate and trimethylhexamethylene diisocyanate (2,2,4-, 2,4,4-, or a mixture thereof), aromatic isocyanates such as 1,3- or 1,4-phenylene diisocyanate, 2,4- or 2,6-tolylene diisocyanate, 4,4'- or 2,4-diphenylmethane diisocyanate and xylylene diisocyanate, alicyclic isocyanates such as cyclohexylene diisocyanate, isophorone diisocyanate, 4,4'-dicyclohexylmethane diisocyanate, methylcyclohexylene diisocyanate and 2,5- or 2,6-norbornane diisocyanate, and adduct types, isocyanurate types, and burette types thereof. These isocyanate monomers can be used alone or in combination of two or more types thereof.

The (meth)acrylamide compound (A) having a hydroxyl group is methacrylamide containing a hydroxyl group and acrylamide containing a hydroxyl group, and these may be used alone or in combination of two or more types thereof. In addition, by using acrylamide containing a hydroxyl group, improvement effects of stickiness of the coating film is high, and curability is significantly improved, and thus, this is particularly preferable.

(A) of the present invention is a compound represented by Formula [1] ($R_1$ represents a hydrogen atom or a methyl group, $R_2$ represents an alkyl group having 1 to 3 carbon atoms substituted with a hydroxyl group, and $R_3$ represents a hydrogen atom, an alkyl group having 1 to 3 carbon atoms or an alkyl group having 1 to 3 carbon atoms substituted with a hydroxyl group).

[Chem. 2]

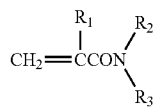

Formula (I)

Examples of the compound (A) include N-hydroxymethyl (meth)acrylamide, N-hydroxyethyl (meth)acrylamide, N-hydroxypropyl (meth)acrylamide, N-hydroxyisopropyl (meth)acrylamide, N-methylhydroxymethyl (meth)acrylamide, N-methylhydroxyethyl (meth)acrylamide, N-methylhydroxypropyl (meth)acrylamide, N-methylhydroxy isopropyl (meth)acrylamide, N-ethylhydroxymethyl (meth)acrylamide, N-ethylhydroxyethyl (meth)acrylamide, N-ethylhydroxypropyl (meth)acrylamide, N-ethylhydroxyisopropyl (meth)acrylamide, N-propylhydroxymethyl (meth)acrylamide, N-propylhydroxyethyl (meth)acrylamide, N-propylhydroxypropyl (meth)acrylamide, N-propylhydroxyisopropyl (meth)acrylamide, N-i sopropylhydroxyethyl (meth)acrylamide, N-isopropylhydroxypropyl (meth)acrylamide, N-isopropylhydroxyisopropyl (meth)acrylamide, N,N-dihydroxymethyl (meth)acrylamide, N,N-dihydroxyethyl (meth) acrylamide, N,N-dihydroxypropyl (meth)acrylamide and N,N-dihydroxyisopropyl (meth)acrylamide. In particular, since N-hydroxyethyl (meth)acrylamide has a high refractive index (1.502), it is possible to provide excellent transparency, since N-hydroxyethyl (meth)acrylamide has low skin irritation (PII=0), safety is high and handling is easy, and since it is possible to easily obtain a high purity industrial products, the N-hydroxyethyl (meth)acrylamide is preferable. These (meth)acrylamides containing a hydroxyl group can be used alone or in combination of two or more types thereof.

In an addition reaction of (A) with the compound (C), the total of the hydroxyl groups is preferably an equivalent or greater with respect to the total of isocyanate groups, and a method in which a reaction is performed such that the equivalent ratio (hydroxyl group/isocyanate group) becomes 1.01/1 to 3/1 is particularly preferable. If the total of hydroxyl groups is less than the equivalent, even in a case where the remaining isocyanate groups are small, the reactivity with carbon dioxide or water is high, and thus, there is a possibility that the stability of the product deteriorates. On the other hand, if the total of hydroxyl groups is greater than three times equivalents, the amount of remaining hydroxyl groups is increased, and depending on the average molecular weight of the obtained urethane oligomer, there is a possibility that water resistance and moisture resistance deteriorate.

The urethanization reaction of the present invention is a reaction of a polybutadiene-based polyol or a polycarbonate-based polyol with the isocyanate monomer (B) and a reaction of the (meth) acrylamide compound (A) having a hydroxyl group with the isocyanate compound (C), but it is possible to perform by mixing any reaction components and by raising the temperature as necessary, by a known method. It is desirable that this reaction is performed at a temperature of 10° C. to 160° C., and preferably at a temperature of 20° C. to 140° C. The mixing of the reaction components can be performed by a known method. The addition of the reaction components can be performed in several stages if desired. In addition, the reaction can be performed in the absence of a solvent, but as necessary, can be performed in an organic solvent or in a reactive diluent. Examples of the solvent which can be used include acetone, methyl ethyl ketone, methyl isobutyl ketone, cyclohexanone, dimethylformamide, dimethylacetamide, dimethyl sulfoxide, ethyl acetate, butyl acetate, tetrahydrofuran, hexane, cyclohexane, benzene, toluene, xylene and aliphatic hydrocarbon-based solvents (petroleum ether), and the reaction can be performed in the presence of the above solvent. The reactive diluent which can be used is not particularly limited as long as it does not react with isocyanate, and examples thereof include methyl (meth)acrylate, ethyl (meth)acrylate, butyl (meth) acrylate, 2-ethylhexyl (meth)acrylate, cyclohexyl (meth) acrylate, 1,6-hexane diacrylate, tetraethylene glycol diacrylate, dipentaerythritol hexaacrylate, trimethylolpropane triacrylate, isobornyl (meth)acrylate, dimethyl (meth)acrylamide, di(meth)ethyl acrylamide and N-(meth)acryloylmorpholine. The amount of an organic solvent or a reactive diluent used is 0% to 400% by weight, and suitably 0% to 200% by weight with respect to the isocyanate compound.

In the reaction, a catalyst can be added for the purpose of accelerating the reaction. Examples of the catalyst include a potassium or sodium salt of alkylphosphonic acid, metal salts such as a sodium salt, a potassium salt, a nickel salt, a cobalt salt, a cadmium salt, a barium salt, a calcium salt, and a zinc salt of fatty acids having 8 to 20 carbon atoms, and organic tin compounds such as dibutyl tin dilaurate, dioctyl tin maleate, dibutyl dibutoxytin, bis(2-ethylhexyl) tin oxide, and 1,1,3,3-tetrabutyl-1,3-diacetoxydistannoxane, and these can be used alone or in combination of two or more types thereof. The amount of the catalyst used is preferably usually 5% by weight or less, and more preferably 3% by weight or less, with respect to the total weight of the raw material components.

In the urethanization reaction, to prevent radical polymerization of (A), a polymerization inhibitor can be used as necessary. Examples of the radical polymerization inhibitor include quinone-based polymerization inhibitors such as hydroquinone, methoxyhydroquinone, benzoquinone and p-tert-butylcatechol; alkyl phenol-based polymerization inhibitors such as 2,6-di-tert-butylphenol, 2,4-di-tert-butylphenol, 2-tert-butyl 4,6-dimethylphenol, 2,6-di-tert-butyl-4-methylphenol and 2,4,6-tri-tert-butylphenol; amine-based polymerization inhibitors such as alkylated diphenylamine, N,N'-diphenyl-p-phenylenediamine, and phenothiazine, and N-oxyls such as 4-hydroxy-2,2,6,6-tetramethylpiperidine-N-oxyl; and copper dithiocarbamate-based polymerization inhibitors such as copper dimethyldithiocarbamate, copper diethyldithiocarbamate and copper dibutyldithiocarbamate, and these may be used alone or in combination of two or more types thereof.

The addition amount of these polymerization inhibitors may be suitably set depending on the kind, the blending amount or the like of (A), but from the viewpoint of polymerization preventing effects, convenience in production, and economic efficiency, the addition amount is preferably usually 0.001% to 5% by weight, and more preferably 0.01% to 1% by weight, with respect to the total weight of (A) and (C).

The weight average molecular weight of the (meth)acrylamide-based urethane oligomer of the present invention is 1,000 to 50,000, and preferably 2,000 to 20,000. In the component having a weight average molecular weight of less than 1,000, theadduct of (A) and (B) (urethane adduct compound) is largely contained, and the transparency of the resin composition formed of the adduct and the curability by irradiation with active energy rays deteriorate, and the adhesion and the water resistance of the obtained coating film also deteriorate. On the other hand, if the weight average molecular weight is greater than 50,000, the viscosity is increased, and as a result, handling becomes poor, and thus, this is not preferable.

In the (meth)acrylamide-based urethane oligomer of the present invention, the content of a component having a molecular weight of 1,000 or less (excluding (A)) is 5% by weight or less, and particularly preferably 3% by weight or less. If the content of a component having a molecular weight of less than 1,000 is greater than 5% by weight, the solubility of the urethane oligomer of the present invention in general-purpose solvents or general-purpose monomers significantly deteriorates, and physical properties such as the curability and the transparency of the active energy ray cured product, or the adhesion to each substrate, shrinkage resistance, moisture resistance, strength, elongation and the like deteriorate, and thus, this is not preferable.

The average number of functional groups (average value of (meth)acrylamide groups contained in one molecule) of the (meth)acrylamide-based urethane oligomer of the present invention is preferably 1 to 10, and more preferably 2 to 6. If the average number of functional groups is less than 1, there is a concern that active energy ray curability by the presence of a non-polymerizable compound, and the strength and the water resistance of the cured film deteriorate. In addition, if the average number of functional groups is greater than 10, the curing speed is increased, but the cured film becomes too hard, and as a result, elongation deteriorates and curing shrinkage is also increased, and thus, this is not preferable.

The glass transition temperature (Tg) of the (meth)acrylamide-based urethane oligomer of the present invention is preferably −50° C. to 80° C., and more preferably −30° C. to 50° C. If Tg is lower than −50° C., the surface curability of the cured film deteriorates, and the surface is likely to be sticky. In addition, if Tg is higher than 80° C., the film after curing becomes too hard, and thus, the strength and the hardness are improved, but the form followability deteriorates, and the flexibility or the elongation is sometimes reduced, and thus, this is not preferable.

Even in the case of the (meth)acrylamide-based urethane oligomer of the present invention alone, by mixing with other active energy ray curable monomers or oligomers, it is possible to prepare an active energy ray curable resin composition. In a case where the (meth)acrylamide-based urethane oligomer of the present invention is used alone, depending on the structure of the main chain skeleton, the type or the number of (meth)acrylamide groups and the molecular weight of the oligomer, physical properties such as the curability of the resin composition, the water absorption, the strength and the elongation of the obtained cured product are different, but generally, the physical properties are preferably within the following ranges.

The (meth)acrylamide-based urethane oligomer of the present invention can be completely cured by irradiation with active energy rays. The active energy ray irradiation amount required (cumulative amount of light) varies depending on the type and the number of (meth)acrylamide groups in a urethane oligomer, the type of an energy ray light source, the irradiation method and the like, but the amount is preferably 2 to 10,000 mJ/cm$^2$, and particularly preferably about 5 to 5,000 mJ/cm$^2$. If the cumulative amount of light is less than 2 mJ/cm$^2$, insufficiently cured portions remain, and thus, there is a concern that the strength, the elongation and the water resistance of the overall cured product deteriorate. In addition, if the cumulative amount of light is greater than 10,000 mJ/cm$^2$, side reactions such as decomposition occur due to excess energy, or the cured film tends to be easily colored.

The water absorption of a cured film formed of the (meth)acrylamide-based urethane oligomer of the present invention is preferably 2% or less, and more preferably 1% or less. If the water absorption is greater than 2%, in the case of using for a long period of time under a high humidity environment, by the cured film absorbing water over time, distortion of the shape occurs by swelling, and thus, there is a possibility that the adhesion or the transparency deteriorate.

The tensile strength at break of a cured film formed of the (meth)acrylamide-based urethane oligomer of the present invention is preferably 5 to 50 N/mm, and the tensile elongation at break is preferably 5 to 200%. If the strength and the elongation of the (meth)acrylamide-based urethane oligomer is within these ranges, an active energy ray curable resin composition formed by mixing with other active energy ray curable monomers or oligomers can be used in a various fields such as pressure sensitive adhesives, adhesives, hard coats, sealants, ink compositions, and the like.

An active energy ray curable resin composition in which the (meth)acrylamide-based urethane oligomer of the present invention is blended can contain a general-purpose acrylic monomer (D) and/ or a polymerizable quaternary salt ionic liquid (E) as needed.

Here, as the component (D), various components such as monofunctional (meth)acrylate and/or monofunctional (meth)acrylamide or polyfunctional (meth)acrylate and/or polyfunctional (meth)acrylamide can be used. In addition, these configuration compounds of the component (D) may be used alone or in combination of two or more types thereof.

Examples of the monofunctional (meth)acrylate include (meth)acrylates having a saturated or unsaturated and linear or branched alkyl group having 1 to 22 carbon atoms, alkoxy (1 to 4 carbon atoms) alkyl (1 to 4 carbon atoms) (meth)

acrylates, alkoxy (1 to 4 carbon atoms) di(tri or tetra)alkyl (1 to 4 carbon atoms) (meth)acrylates, 2-(2-ethoxyethoxy) ethyl acrylate, phenoxyalkyl (meth)acrylates, phenoxy (di-, tri-, tetra, or hexa)alkylene (1 to 4 carbon atoms) glycol (meth)acrylates, alkoxy (1 to 4 carbon atoms) di(tri)alkylene (1 to 4 carbon atoms) glycol (meth)acrylates, cyclohexyl (meth)acrylate, tert-butylcyclohexyl (meth)acrylate, benzyl (meth)acrylate, phenoxyethyl (meth)acrylate, dicyclopentanyl (meth)acrylate, dicyclopentenyl (meth)acrylate, (iso) bornyl (meth)acrylate, tetrahydrofurfuryl acrylate, 2-methyl-2-adamantyl (meth)acrylate, allyl (meth)acrylates and hydroxyalkyl (1 to 6 carbon atoms) (meth)acrylates.

Examples of the monofunctional (meth)acrylamide used in the present invention include N-methyl (meth)acrylamide, N-ethyl (meth)acrylamide, N-methoxymethyl (meth)acrylamide, N-ethoxymethyl (meth)acrylamide, N-methoxyethyl (meth)acrylamide, N-ethoxyethyl (meth)acrylamide, N-n-butoxymethyl (meth)acrylamide, N-isobutoxymethyl (meth) acrylamide, N-vinylpyrrolidone, N-vinylcaprolactam, N-(2-hydroxyethyl) acrylamide, N-[3-(dimethylamino)]propyl acrylamide, N,N-dimethyl (meth)acrylamide, N,N-diethyl (meth)acrylamide, N-(meth)acryloylmorpholine and hydroxyalkyl (meth)acrylamides such as hydroxyethyl acrylamide described above.

Examples of the polyfunctional (meth)acrylate include monomers and oligomers such as (di)ethylene glycol di(meth)acrylate, (tri)propylene glycol di(meth)acrylate, ditetraethylene glycol di(meth)acrylate, polyalkylene (1 to 4 carbon atoms) glycol di(meth)acrylate, polytetramethylene glycol di(meth)acrylate, 1,3(or 1,4)-butanediol di(meth) acrylate, 1,6-hexanediol di(meth)acrylate, dicyclopentanyl di(meth)acrylate, caprolactone-modified dicyclopentenyl di(meth)acrylate, pentaerythritol tetra(or tri)(meth)acrylate, dipentaerythritol hexa(meth)acrylate, trimethylolethane tri (meth)acrylate, trimethylolpropane tri(meth)acrylate, tricyclodecanedimethanol di(meth)acrylate, ethylene (or propylene)oxide-modified bisphenol A di(meth)acrylate, cyclohexanedimethanol di(meth)acrylate, acrylate ester (dioxaneglycoldiacrylate), alkoxylated (cyclo)hexanediol di(meth)acrylate, epoxy (meth)acrylate and urethane (meth) acrylate.

Examples of the polyfunctional (meth) acrylamide include methylene (or ethylene) bis(meth)acrylamide and diallyl (meth)acrylamide.

As the component (E), an organic ionic compound can be blended. Examples of the organic-based ionic compound include ionic vinyl monomers and/or oligomers and polymers having these as configuration components. The ionic vinyl monomer is an onium salt obtained by combining a cation and an anion, and specifically, as cations, (meth) acrylate-based or (meth)acrylamide-based ammonium ions or imidazolium ions, and as anions, halogen ions such as Cl$^-$, Br$^-$ and I$^-$, inorganic acid anions or organic acid anions such as OH$^-$, CH$_3$COO$^-$, NO$_3^-$, ClO$_4^-$, PF$_6^-$, BF$_4^-$, HSO$_4^-$, CH$_3$SO$_3^-$, CF$_3$SO$_3^-$, CH$_3$C$_6$H$_6$SO$_3^-$, C$_4$F$_9$SO$_3^-$, (CF$_3$SO$_2$)$_2$N$^-$ and SCN$^-$ are exemplified.

As the synthetic method of an ionic vinyl monomer used in the present invention, generally, there are a method of quaternizing a tertiary amine having a polymerizable group with a quaternizing agent such as alkyl halide, dialkyl sulfate or methyl p-toluenesulfonate, a method of performing anion exchange on the quaternary ammonium salt obtained by quaternization using a salt having a desired anion, and a method of converting a quaternary ammonium salt to hydroxide using an anion exchange resin and then neutralizing with an acid having a desired anion, and details are described in JP-A-2011-012240, JP-A-2011-074216, JP-A-2011-140448, JP-A-2011-140455, and JP-A-2011-153109 previously reported by the present inventors.

Since ions of organic-based ionic compounds easily form a hydrogen bond or an ionic bond with a coating substrate, and can impart conductivity or antistatic properties, wettability is improved, it is possible to more uniformly apply, and it is possible to more stably form a film. Furthermore, since an ionic vinyl monomer itself is also an active energy ray curable compound, by copolymerizing with the active energy ray curable resin composition of the present invention, it is possible to provide auxiliary effects permanently imparting conductivity or antistatic properties without bleeding out and adhesion improving effects.

The organic-based ionic compound can be used in combination of one type or as necessary, two or more types selected from monomolecular compounds having a molecular weight of several tens to several hundreds, oligomers having a molecular weight of several hundreds to several thousands and polymers having a molecular weight of several thousands to tens of thousands. The blending amount of the organic-based ionic compound can be adjusted by the number of functional groups and the molecular weight of the ion pair, and thus, is not particularly limited. In general, 0% to 50% by weight is added, and 0% to 10% by weight is preferably added, with respect to the urethane oligomer of the present invention. If the blending amount of the organic-based ionic compound is greater than 50% by weight, there is a possibility that the deterioration of transparency of a cured film occurs depending on the type of the organic-based ionic compound.

The active energy rays of the present invention is defined as energy rays which can generate an active species by decomposing a compound (photopolymerization initiator) which generates an active species. Examples of such an active energy rays include light energy rays such as visible light, an electron beam, ultraviolet rays, infrared rays, X-rays, α-rays, β-rays, and γ-rays. Among these, it is preferable to use ultraviolet rays in balance among a generator of active energy rays, a curing speed and safety. Examples of the ultraviolet ray source include a xenon lamp, a low pressure mercury lamp, a high pressure mercury lamp, a metal halide lamp, an ultraviolet ray LED lamp, and a microwave type excimer lamp.

Irradiation with active energy rays is preferably performed in an inert gas atmosphere such as nitrogen gas or carbon dioxide gas or in an atmosphere in which the oxygen concentration is reduced, but since the (meth)acrylamide-based urethane oligomer of the present invention has excellent curability, in an active energy ray curable resin composition using the same, it is possible to sufficiently obtain curing even at normal air atmosphere. The irradiation temperature of the active energy rays is preferably 10° C. to 200° C., and the irradiation time is preferably 1 second to 60 minutes.

When curing the active energy ray curable resin composition of the present invention, a photopolymerization initiator can be added as necessary, but it is not particularly necessary in the case of using an electron beam. The photopolymerization initiator may be suitably selected from usual ones such as an acetophenone-based photopolymerization initiator, a benzoin-based photopolymerization initiator, a benzophenone-based photopolymerization initiator and a thioxanthone-based photopolymerization initiator. As commercially available products, such as product names Darocur 1116, Darocur 1173, Irgacure 184, Irgacure 369—, Irgacure 500, Irgacure 651, Irgacure 754, Irgacure 819, Irgacure 907, Irgacure 1300, Irgacure 1800, Irgacure 1870, Irgacure 2959, Darocur 4265 and Darocur TPO manufactured by BASF SE, and product name Ubecryl P36 manufactured by UCB Chemicals can be used. These photopolymerization initiators can be used singly or in combination of two or more types thereof.

The amount of the photopolymerization initiator used is not particularly limited, and in general, 0.1% to 10% by weight is added, and 1% to 5% by weight is preferably added, with respect to the active energy ray curable resin composition. If the amount is less than 0.1% by weight, sufficient curability is not obtained, and if the amount is greater than 10% by weight, there is a possibility that deterioration of the strength or yellowing of the coating film.

In a range that does not impair the characteristics of the active energy ray curable resin composition of the present invention and the molded article produced from the same, an other arbitrary component such as a pigment, a dye, a surfactant, an antiblocking agent, a leveling agent, a dispersing agent, a defoamer, an antioxidant, an ultraviolet sensitizer or a preservative may be used in combination.

By applying the active energy ray curable resin composition of the present invention to the surface of a substrate or between substrates, such as paper, fabric, nonwoven fabric, glass, plastics including polyethylene terephthalate, diacetate cellulose, triacetate cellulose, an acrylic polymer, polyvinyl chloride, cellophane, celluloid, polycarbonate and polyimide, and metals, and by curing by irradiation with an active energy rays, it is possible to obtain a coating layer or an ink layer, a pressure sensitive adhesive layer, a sealant layer or an adhesive layer, each having high performance. In particular, since the active energy ray curable resin composition of the present invention has a urethane oligomer having high transparency, the active energy ray curable resin composition of the present invention can be appropriately used as an optical resin composition such as an optical pressure sensitive adhesive, an optical adhesive or sealant, or a coating material of an optical film. As the method of applying the resin composition on a substrate, a normal coating film formation method such as a spin coating method, a spray coating method, a dipping method, a gravure roll method, a knife coating method, a reverse roll method, a screen printing method, or a bar coater method can be used. In addition, as the method of applying between substrates, a lamination method, a roll-to-roll method, and the like are exemplified.

EXAMPLES

Hereinafter, the present invention will be described in more detail with reference to synthesis examples and evaluation examples, but the present invention is not limited to the examples. Physical property analysis of the obtained urethane oligomer was performed by the following methods.

(1) Measurement of Molecular Weight Measurement

The weight average molecular weight of the obtained urethane oligomer and the content of the low molecular weight component were measured by high-performance liquid chromatography ("LC-10A" manufactured by Shimadzu Corporation, column: Shodex GPC KF-806L (exclusion limit molecular weight: 2 x $10^7$, separation range: 100 to 2×$10^7$, theoretical plate number: 10,000 plates/one, filler material: styrene-divinylbenzene copolymer, filler particle size: 10 μm), eluent: tetrahydrofuran) and calculated by a standard polystyrene molecular weight conversion method.

(2) Measurement of Viscosity

The viscosity of each of the urethane oligomers obtained in the synthesis examples and the comparative synthesis examples was measured at a predetermined temperature by using a cone-plate type viscometer ("RE550 viscometer" manufactured by Toki Sangyo Co., Ltd.) according to JIS K5600-2-3.

(3) Measurement of Glass Phase Transition Temperature (Tg)

1 part by weight of the synthesized urethane oligomer, 1 part by weight of methyl ethyl ketone (MEK) and 0.03 parts by weight of Darocur 1173 as a photopolymerization initiator were homogeneously mixed, whereby an ultraviolet ray curable resin composition was prepared. After the obtained curable composition was applied to a fluorine resin sheet, the resulting product was dried (80° C., 2 minutes), and cured by ultraviolet irradiation (accumulated amount of light of 2,000 mJ/$cm^2$). 10 mg of a homopolymer of urethane oligomers was taken out from the obtained cured film and put into an aluminum pan and sealed, and using a differential scanning calorimeter (EXSTAR 6000 manufactured by SII Nano-Technology Inc.), the glass phase transition temperature thereof was measured at a temperature raising rate of 10 °C./min.

Synthesis Example 1

Synthesis of Urethane Oligomer UTB-1

Into a 300 mL four-neck flask provided with a stirrer, a thermometer, a condenser and a gas inlet tube, 13.9 g (62.5 mmol) of isophorone diisocyanate (IPDI) and 0.04 g of dibutyl tin dilaurate were put, then, while passing dry nitrogen, 70.0 g (50.0 mmol) of G-1000 (polybutadiene having hydroxyl groups at both terminals, number average molecular weight=1,400) was added dropwise thereto while preparing the dropping rate so as to be maintained at 80° C., and the resulting product was allowed to react at 80° C. for 2 hours. Next, after the reaction solution was cooled to 40° C., 0.1 g of methyl hydroquinone (MHQ) was added thereto, and bubbling was performed with dry air for 10 minutes. 2.4 g (20.7 mmol) of hydroxyethyl acrylamide (manufactured by KJ Chemicals Corporation, registered trademark "HEAA") was put thereinto, and under a dry air stream, the resulting product was continuously stirred for 6 hours while maintaining the temperature in the system at 80° C. 84.1 g of UTB-1 was obtained as a pale yellow viscous liquid, and the yield was 98.5%. Analysis by infrared absorption spectrum (IR) was performed, and in this analysis, specific absorption (2,250 $cm^{-1}$) of the isocyanate group of IPDI which was a raw material completely disappeared, or specific absorption (1,650 $cm^{-1}$) of the amide group derived from "HEAA" and specific absorption (1,740 $cm^{-1}$) of the urethane bond generated were detected, and from the result, generation of a target urethane oligomer UTB-1 was confirmed. The weight average molecular weight of UTB-1 was 8,300, the viscosity at 60° C. was 88,000 mPa·s, Tg was 1.3° C., and the low molecular weight components included was 2.5%.

Synthesis Example 2

Synthesis of Urethane Oligomer UTB-2

In the same manner as in Synthesis Example 1, 75.0 g (50.0 mmol) of GI-1000 (hydrogenated polybutadiene having hydroxyl groups at both terminals, number average molecular weight: 1,500) was added dropwise to a mixed solution of 13.5 g (80.0 mmol) of hexamethylene diisocyanate (HDI) and 0.04 g of dibutyl tin dilaurate, and the resulting product was allowed to react at 70° C. for 2 hours. Thereafter, in the same manner as in Synthesis Example 1, 0.1 g of MHQ and 4.4 g (34.2 mmol) of N-methylhydroxyethyl acrylamide (MHEAA) were added thereto, and the resulting product was allowed to react at 80° C. for 2 hours. 88.2 g of UTB-2 was obtained as a pale yellow viscous liquid, and the yield was 97.8%. Generation of UTB-2 was confirmed by IR analysis. The weight average molecular weight of UTB-2 was 5,300, the viscosity at 60° C. was 65,000 mPa·s, Tg was 5.4° C., and the low molecular weight components included was 2.1%.

Synthesis Example 3

Synthesis of Urethane Oligomer UTB-3

11.9 g (53.5 mmol) of IPDI, 125 g (50.0 mmol) Poly ip (polyisoprene having hydroxyl groups at both terminals, number average molecular weight: 2,500), and 0.07 g of dibutyl tin dilaurate were put into the same apparatus as that used in Synthesis Example 1, and while passing dry nitrogen, the resulting product was allowed to react at 90° C. for 5 hours. Next, 0.1 g of MHQ and 1.7 g (14.8 mmol) of "HEAA" were put thereinto, and the resulting product was allowed to react at 80° C. for 5 hours. 136.5 g of UTB-3 was obtained as a pale yellow viscous liquid, and the yield was 98.2%. Generation of UTB-3 was confirmed by IR analysis. The weight average molecular weight of UTB-3 was 18,000, the viscosity at 60° C. was 91,000 mPa·s, Tg was −9.3° C., and the low molecular weight components included was 1.5%.

Synthesis Example 4

Synthesis of Urethane Oligomer UTB-4

70.0 g (50.0 mmol) of G-1000 and 0.04 g of dibutyl tin dilaurate were put into the same apparatus as that used in Synthesis Example 1, then, while passing dry nitrogen, 18.5 g (110.0 mmol) of HDI was added dropwise thereto while maintaining the temperature at 80° C., and the resulting product was allowed to react at 80° C. for 7 hours. Next, in the same manner as in Synthesis Example 1, 0.1 g of MHQ and 3.9 g (30.0 mmol) of hydroxyethyl methacrylamide (MHEAA) were put thereinto, and the resulting product was continuously stirred at 80° C. for 7 hours. 90.4 g of UTB-4 was obtained as a pale yellow viscous liquid, and the yield was 97.6%. Generation of UTB-4 was confirmed by IR analysis. The weight average molecular weight of UTB-4 was 12,000, the viscosity at 60° C. was 85,000 mPa·s, Tg was -2.3° C., and the low molecular weight components included was 1.8%.

Synthesis Example 5

Synthesis of Urethane Oligomer UTB-5

70.0 g (50.0 mmol) of G-1000, 22.2 g (100.0 mmol) of IPDI and 110 g of dimethylacetamide (DMAc) were put into the same apparatus (capacity of 500 mL) as that used in Synthesis Example 1, and while passing dry nitrogen, the resulting product was allowed to react at 100° C. for 10 hours. Next, in the same manner as in Synthesis Example 1, 0.1 g of MHQ, 8.0 g (69.3 mmol) of "HEAA", and 30 g of DMAc were put thereinto, and the resulting product was allowed to react at 80° C. for 8 hours. The solvent was distilled off under reduced pressure, and as a result, 91.5 g of UTB-5 was obtained as a pale yellow viscous liquid, and the yield was 96.4%. Generation of UTB-5 was confirmed by IR analysis. The weight average molecular weight of UTB-5 was 2,700, the viscosity at 60° C. was 13,000 mPa·s, Tg was 13.3° C., and the low molecular weight components included was 1.1%.

Synthesis Example 6

Synthesis of Urethane Oligomer UTB-6

In the same manner as in Synthesis Example 1, a mixture of 42.0 g (30.0 mmol) of G-1000 and 75.0 g (30.0 mmol) of Poly ip was added dropwise to a mixed solution of 16.1 g (95.8 mmol) of HDI and 0.04 g of dibutyl tin dilaurate at 80° C., and the resulting product was allowed to react for 2 hours. Next, in the same manner as in Synthesis Example 1, 0.1 g of MHQ and 5.1 g (39.8 mmol) of MHEAA were put thereinto, and the resulting product was continuously stirred at 80° C. for 6 hours. 136.4 g of UTB-6 was obtained as a pale yellow viscous liquid, and the yield was 98.5%. Generation of a target urethane oligomer UTB-6 was confirmed by IR analysis. The weight average molecular weight of UTB-6 was 6,000, the viscosity at 60° C. was 70,000 mPa·s, Tg was 4.2° C., and the low molecular weight components included was 4.1%.

Synthesis Example 7

Synthesis of Urethane Oligomer UTB-7

In the same manner as in Synthesis Example 1, a mixture of 28.0 g (20.0 mmol) of GI-1000 and 75.0 g (30.0 mmol) of EPOL (hydrogenated polyisoprene having hydroxyl groups at both terminals, number average molecular weight=2,500) was added dropwise to a mixture of 12.1 g (57.5 mmol) of trimethylhexamethylene diisocyanate (TMDI) and 0.04 g of dibutyl tin dilaurate, and the resulting product was allowed to react at 80° C. for 2 hours. Next, in the same manner as in Synthesis Example 1, 0.1 g of MHQ and 2.3 g (20.0 mmol) of "HEAA" were put thereinto, and the resulting product was continuously stirred at 80° C. for 3 hours. 114.8 g of UTB-7 was obtained as a pale yellow viscous liquid, and the yield was 97.6%. Generation of UTB-7 was confirmed by IR analysis. The weight average molecular weight of UTB-7 was 12,000, the viscosity at 60° C. was 100,000 mPa·s, Tg was −5.1° C., and the low molecular weight components included was 1.7%.

Synthesis Example 8

Synthesis of Urethane Oligomer UTB-8

56.0 g (40.0 mmol) of G-1000, 25.0 g (10.0 mmol) of Poly ip and 0.04 g of dibutyl tin dilaurate were put into the same apparatus as that used in Synthesis Example 1, then, while passing dry nitrogen, 10.1 g (60.0 mmol) of HDI was added dropwise thereto while maintaining the temperature at 80° C., and the resulting product was allowed to react at 80° C. for 2 hours. Next, in the same manner as in Synthesis Example 1, 0.1 g of MHQ and 2.3 g (20.0 mmol) of "HEAA" were put thereinto, and the resulting product was continuously stirred at 80° C. for 3 hours. 92.3 g of UTB-8 was obtained as a pale yellow viscous liquid, and the yield was 96.9%. Generation of UTB-8 was confirmed by IR analysis. The weight average molecular weight of UTB-8 was 9,300, the viscosity at 60° C. was 95,000 mPa·s, Tg was 0.5° C., and the low molecular weight components included was 1.8%.

Synthesis Example 9

Synthesis of Urethane Oligomer UTB-9

In the same manner as in Synthesis Example 8, 9.7 g (57.5 mmol) of HDI was added dropwise to a mixed solution of 3.8 g (2.5 mmol) of GI-1000, 118.8 g (47.5 mmol) of EPOL and 0.04 g of dibutyl tin dilaurate at 80° C., and the resulting product was allowed to react for 2 hours. Next, in the same manner as in Synthesis Example 1, 0.1 g of MHQ and 2.9 g (25.0 mmol) of "HEAA" were put thereinto, and the resulting product was continuously stirred at 80° C. for 3 hours. 133.6 g of UTB-9 was obtained as a pale yellow viscous liquid, and the yield was 98.9%. Generation of UTB-9 was confirmed by IR analysis. The weight average molecular weight of UTB-9 was 10,600, the viscosity at 60° C. was 150,000 mPa~s, Tg was −1.1° C., and the low molecular weight components included was 2.3%.

Synthesis Example 10

Synthesis of Urethane Oligomer UTB-10

150.0 g (50.0 mmol) of G-3000 (polybutadiene having hydroxyl groups at both terminals, number average molecular weight: 3,000), and 22.2 g (100.0 mmol) of IPDI were put into the same apparatus as that used in Synthesis Example 1, and while passing dry nitrogen, the resulting product was allowed to react at 130° C. for 1 hour. Next, in the same manner as in Synthesis Example 1, 0.2 g of MHQ and 45.0 g (391.3 mmol) of "HEAA" were put thereinto, and the resulting product was continuously stirred at 70° C. for 8 hours. 205.3 g was obtained as a pale yellow viscous liquid, and the yield was 97.7%. Generation of a urethane oligomer was confirmed by IR analysis. Since, when the low molecular weight components included was measured, the low molecular weight components included was 6.5%, a purification step was further performed.

The obtained urethane oligomer was reprecipitated from a mixed solution of methyl ethyl ketone and water, whereby low molecular weight materials were removed. The methyl ethyl ketone and the water were completely removed under reduced pressure, whereby a target urethane oligomer UTB-10 was obtained as a pale yellow viscous liquid. Evaluations were performed by the above methods, and the weight average molecular weight of UTB-10 was 4,200, the viscosity at 60° C. was 22,000 mPa·s, Tg was 8.4° C., and the low molecular weight components included was 0.4%.

Synthesis Example 11

Synthesis of Urethane Oligomer UTC-1

In the same manner as in Synthesis Example 1, 12.7 g (57.0 mmol) of IPDI and 0.03 g of dibutyl tin dilaurate were put, then, 50.0 g (50.0 mmol) of C-1090 (polycarbonate polyol having hydroxyl groups at both terminals, which is manufactured by KURARAY Co., Ltd., 3-methyl-1,5-pentanediol/1,6-hexanediol=9/1, weight average molecular weight=1,000) was added dropwise thereto at 80° C., and the resulting product was allowed to react for 2 hours. Next, in the same manner as in Synthesis Example 1, 0.1 g of MHQ and 1.6 g (14.1 mmol) of "HEAA" were put thereinto, and the resulting product was continuously stirred at 80° C. for 3 hours. 63.0 g of UTC-1 was obtained as a pale yellow viscous liquid, and the yield was 97.8%. Generation of UTC-1 was confirmed by IR analysis. The weight average molecular weight of the obtained UTC-1 was 8,900, the viscosity at 60° C. was 65,000 mPa·s, Tg was 5.8° C., and the low molecular weight components included was 1.8%.

Synthesis Example 12

Synthesis of Urethane Oligomer UTC-2

13.5 g (80.0 mmol) of HDI was put into the same apparatus as that used in Synthesis Example 1, then, while passing dry nitrogen, 50.0 g (50.0 mmol) of C-1090 was added dropwise thereto while maintaining the temperature at 60° C., and the resulting product was allowed to react at 60° C. for 5 hours. Next, in the same manner as in Synthesis Example 1, 0.1 g of MHQ and 2.5 g (21.6 mmol) of "HEAA" were put thereinto, and the resulting product was continuously stirred at 80° C. for 2 hours. 61.4 g of UTC-2 was obtained as a pale yellow viscous liquid, and the yield was 97.2%. In the same manner as in Synthesis Example 1, generation of UTC-2 was confirmed by IR analysis.

The weight average molecular weight of UTC-2 was 5,600, the viscosity at 60° C. was 32,000 mPa·s, Tg was 8.6° C., and the low molecular weight components included was 1.2%.

Synthesis Example 13

Synthesis of Urethane Oligomer UTC-3

9.5 g (56.5 mmol) of HDI, 50.0 g (50.0 mmol) of C-1090 and 0.03 g of dibutyl tin dilaurate were put into the same apparatus as that used in Synthesis Example 1 and mixed, and while passing dry nitrogen, the resulting product was heated at 80° C. for 4 hours. Next, in the same manner as in Synthesis Example 1, 0.1 g of MHQ and 1.4 g (10.8 mmol) of MHEAA were put thereinto, and the resulting product was continuously stirred at 60° C. for 3 hours. 59.9 g of UTC-3 was obtained as a pale yellow viscous liquid, and the yield was 98.2%. Generation of UTC-3 was confirmed by IR analysis. The weight average molecular weight of the obtained urethane oligomer UTC-3 was 11,000, the viscosity at 60° C. was 85,000 mPa·s, Tg was 3.2° C., and the low molecular weight components included was 2.5%.

Synthesis Example 14

Synthesis of Urethane Oligomer UTC-4

In the same manner as in Synthesis Example 5, 50.0 g (50.0 mmol) of C-1090, 16.7 g (75.0 mmol) of IPDI, 0.03 g of dibutyl tin dilaurate and 120 g of DMAc were put, and while passing dry nitrogen, the resulting product was allowed to react at 100° C. for 3 hours. Next, in the same manner as in Synthesis Example 1, 0.1 g of MHQ, 6.6 g (51.3 mmol) of HEMAA, and 10 g of DMAc were put thereinto, and the resulting product was continuously stirred at 90° C. for 5 hours. The solvent was distilled off under reduced pressure, and as a result, 70.4 g of UTC-4 was obtained as a pale yellow viscous liquid, and the yield was 95.9%.

Generation of UTC-4 was confirmed by IR analysis. The weight average molecular weight of the obtained UTC-4 was 2,600, the viscosity at 60° C. was 8,900 mPa·s, Tg was 13.3° C., and the low molecular weight components included was 0.8%.

Synthesis Example 15

Synthesis of Urethane Oligomer UTC-5

13.3 g (60.0 mmol) of IPDI, 45.0 g (45.0 mmol) of C-1090, 5.0 g (5.0 mmol) of Uniol D-1000 (polypropylene glycol manufactured by NOF Coporation, weight average molecular weight =1,000 and 0.03 g of dibutyl tin dilaurate were put into the same apparatus as that used in Synthesis Example 1 and mixed, and while passing dry nitrogen, the resulting product was allowed to react at 80° C. for 2 hours. Next, in the same manner as in Synthesis Example 1, 0.1 g of MHQ and 2.3 g (20.1 mmol) of "HEAA" were put thereinto, and the resulting product was continuously stirred at 60° C. for 3 hours. 64.8 g of UTC-5 was obtained as a pale yellow viscous liquid, and the yield was 98.5%. Generation of UTC-5 was confirmed by IR analysis. The weight average molecular weight of the obtained UTC-5 was 6,300, the viscosity at 60° C. was 50,000 mPa·s, Tg was 7.10° C., and the low molecular weight components included was 0.9%.

Synthesis Example 16

Synthesis of Urethane Oligomer UTC-6

35.0 g (35.0 mmol) of C-1090, 45.0 g (15.0 mmol) of polyester diol (manufactured by ADEKA CORPORATION, Adeka New Ace Y6-30, number average molecular weight of 3,000) and 0.04 g of dibutyl tin dilaurate were put into the same apparatus as that used in Synthesis Example 1, then, while passing dry nitrogen, 13.3 g (60.0 mmol) of IPDI was added dropwise thereto while maintaining the temperature at 80° C., and the resulting product was allowed to react at 80° C. for 2 hours. Next, in the same manner as in Synthesis Example 1, 0.1 g of MHQ and 2.1 g (18.3 mmol) of "HEAA" were put thereinto, and the resulting product was continuously stirred at 80° C. for 3 hours. 93.0 g of UTC-6 was obtained as a pale yellow viscous liquid, and the yield was 97.3%. Generation of UTC-6 was confirmed by IR analysis. The weight average molecular weight of the obtained UTC-6 was 10,200, the viscosity at 60° C. was 78,500 mPa·s, and Tg was 3.1° C.

Synthesis Example 17

Synthesis of Urethane Oligomer UTC-7

150.0 g (50.0 mmol) of C-3090 (carbonate polyol having hydroxyl groups at both terminals, 3-methyl-1,5-pentanediol/1,6-hexanediol=9/1, number average molecular weight =3,000) and 27.8 g (125.2 mmol) of IPDI were put into the same apparatus as that used in Synthesis Example 1, and while passing dry nitrogen, the resulting product was allowed to react at 110° C. for 5 hours. Next, in the same manner as in Synthesis Example 1, 0.2 g of MHQ and 5.0 g (43.5 mmol) of "HEAA" were put thereinto, and the resulting product was continuously stirred at 80° C. for 2 hours. 180.4 g was obtained as a pale yellow viscous liquid, and the yield was 98.5%. Generation of a urethane oligomer was confirmed by IR analysis. Since, when the low molecular weight components included were measured, the low molecular weight components included was 6.8%, a purification step was further performed.

The obtained urethane oligomer was purified in the same manner as in Synthesis Example 10, whereby a target urethane oligomer UTC-7 was obtained as a pale yellow viscous liquid. Evaluations were performed by the above methods, and the weight average molecular weight of UTC-7 was 16,000, the viscosity at 60° C. was 135,000 mPa·s, Tg was −1.2° C., and the low molecular weight components included was 0.6%.

Comparative Synthesis Example 1

Synthesis of Urethane Oligomer (UAB-1)

The crude urethane oligomer obtained in Synthesis Example 10 (containing 6.5% of low molecular weight components) was used as UAB-1. Evaluations were performed by the above methods, and the weight average molecular weight of UAB-1 was 3,800, the viscosity at 60° C. was 35,000 mPa·s, and Tg was 5.2° C.

Comparative Synthesis Example 2

Synthesis of Urethane Oligomer (UAB-2)

70.0 g (50.0 mmol) of G-1000, 33.3 g (150.0 mmol) of IPDI and 0.04 g of dibutyl tin dilaurate were put into the same apparatus as that used in Synthesis Example 1, and while passing dry nitrogen, the resulting product was allowed to react at 50° C. for 5 hours. Next, in the same manner as in Synthesis Example 1, 0.1 g of MHQ and 6.3 g (50.0 mmol) of "HEAA" were put thereinto, and the resulting product was continuously stirred at 80° C. for 6 hours. 106.3 g was obtained as a pale yellow viscous liquid, and the yield was 96.8%. Generation of a urethane oligomer was confirmed by IR analysis. The weight average molecular weight of the obtained urethane oligomer UAB-2 was 7,900, the viscosity at 60° C. was 95,000 mPa·s, Tg was −3.4° C., and the low molecular weight components included was 5.2%.

Comparative Synthesis Example 3

Synthesis of Urethane Oligomer UAB-3

13.3 g (59.9 mmol) of IPDI and 0.04 g of dibutyl tin dilaurate were put into the same apparatus as that used in Synthesis Example 1, then, while passing dry nitrogen, 75.0 g (50.0 mmol) of GI-1000 was added dropwise thereto while maintaining the temperature at 80° C., and the resulting product was allowed to react at 80° C. for 6 hours. Next, in the same manner as in Synthesis Example 1, 0.1 g of MHQ and 2.3 g (20.0 mmol) of hydroxyethyl acrylate (HEA) were put thereinto, and under a dry air stream, the resulting product was continuously stirred at 60° C. for 8 hours. 89.0 g was obtained as a pale yellow viscous liquid, and the yield was 97.9%. Analysis by IR was performed, and in this analysis, specific absorption (2,250 cm$^{-1}$) of the isocyanate group of IPDI which was a raw material completely disappeared, or specific absorption (1,730 cm$^{-1}$) of the ester group derived from HEA and specific absorption (1,740 cm$^{-1}$) of the urethane bond generated were detected, and from the result, generation of a urethane oligomer UAB-3 was confirmed. The weight average molecular weight of the obtained UAB-3 was 12,500, the viscosity at 60° C. was 112,000 mPa√s, Tg was −10.7° C., and the low molecular weight components included was 2.1%.

Comparative Synthesis Example 4

Synthesis of Urethane Oligomer UAC-1

The crude urethane oligomer obtained in Synthesis Example 17 (containing 6.8% of low molecular weight components) was used as UAC-1. Evaluations were performed by the above methods, and the weight average molecular weight of UAC-1 was 15,000, the viscosity at 60° C. was 148,000 mPa·s, and Tg was 0.5° C.

Comparative Synthesis Example 5

Synthesis of Urethane Oligomer UAC-2

50.0 g (50.0 mmol) of C-1090, 32.8 g (147.7 mmol) of IPDI and 0.03 g of dibutyl tin dilaurate were put into the same apparatus as that used in Synthesis Example 1, and while passing dry nitrogen, the resulting product was allowed to react at 40° C. for 2 hours. Next, in the same manner as in Synthesis Example 1, 0.1 g of MHQ and 9.2 g (80.0 mmol) of "HEAA" were put thereinto, and the resulting product was continuously stirred at 80° C. for 3 hours. 90.2 g was obtained as a pale yellow viscous liquid, and the yield was 97.9%. Generation of a urethane oligomer UAC-2 was confirmed by IR analysis. The weight average molecular weight of the obtained UAC-2 was 7,900, the viscosity at 60° C. was 82,000 mPa·s, Tg was 5.3° C., and the low molecular weight components included was 5.4%.

Comparative Synthesis Example 6

Synthesis of Urethane Oligomer UAC-3

50.0 g (50.0 mmol) of C-1090, 13.3 g (60.0 mmol) of IPDI and 0.03 g of dibutyl tin dilaurate were put into the same apparatus as that used in Synthesis Example 1, and while passing dry nitrogen, the resulting product was allowed to react at 80° C. for 2 hours. Next, in the same manner as in Synthesis Example 1, 0.1 g of MHQ and 1.3 g (11.2 mmol) of HEA were added thereto, and the resulting product was continuously stirred at 60° C. for 3 hours. 63.6 g was obtained as a pale yellow viscous liquid, and the yield was 98.3%. Generation of a urethane oligomer UAC-3 was confirmed by IR analysis. The weight average molecular weight of the obtained UAC-3 was 12,500, the viscosity at 60° C. was 103,000 mPa·s, Tg was −2.5° C., and the low molecular weight components included was 1.2%.

The characteristics of the urethane oligomers obtained in Synthesis Examples 1 to 17 and Comparative Synthesis Examples 1 to 6 were evaluated by the following methods, and the results are shown in Tables 1 and 2. The solvents and the monomers used in the evaluation are as follows.
IPA: isopropanol
MEK: methyl ethyl ketone
THF: tetrahydrofuran
"ACMO": N-acryloylmorpholine (manufactured by KJ Chemicals Corporation)
HDDA: 1,6-hexanediol diacrylate
BA: butyl acrylate
IBOA: isobornyl acrylate
2EHA; 2-ethylhexyl acrylate
THFA; tetrahydrofurfuryl acrylate
(4) Compatibility A general-purpose solvent as a diluent and 1 part by weight of an acrylic monomer were added to 1 part by weight of the obtained urethane oligomer and stirred, then, the resulting product was allowed to stand overnight, and the extent of dissolution was examined by visual observation.

A: transparency was high, and cloudiness or separation was not observed at all.

B: although transparency was high, cloudiness was slightly observed.

C: although layer separation did not occur, cloudiness was observed.

D: cloudiness was observed, and layer separation occurred

TABLE 1

| | | Evaluation Examples | | | | | | | | | | | | | | | | | |
|---|---|---|---|---|---|---|---|---|---|---|---|---|---|---|---|---|---|---|
| | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 |
| Urethane oligomer | UTB-1 | 100 | | | | | | | | | | | | | | | | 30 | |
| | UTB-2 | | 100 | | | | | | | | | | | | | | | | |
| | UTB-3 | | | 100 | | | | | | | | | | | | | | | |
| | UTB-4 | | | | 100 | | | | | | | | | | | | | | |
| | UTB-5 | | | | | 100 | | | | | | | | | | | | | |
| | UTB-6 | | | | | | 100 | | | | | | | | | | | | |
| | UTB-7 | | | | | | | 100 | | | | | | | | | | | |
| | UTB-8 | | | | | | | | 100 | | | | | | | | | | |
| | UTB-9 | | | | | | | | | 100 | | | | | | | | | |
| | UTB-10 | | | | | | | | | | 100 | | | | | | | | |
| | UTC-1 | | | | | | | | | | | 100 | | | | | | 70 | |
| | UTC-2 | | | | | | | | | | | | 100 | | | | | | |
| | UTC-3 | | | | | | | | | | | | | 100 | | | | | |
| | UTC-4 | | | | | | | | | | | | | | 100 | | | | |
| | UTC-5 | | | | | | | | | | | | | | | 100 | | | |
| | UTC-6 | | | | | | | | | | | | | | | | 100 | | |
| | UTC-7 | | | | | | | | | | | | | | | | | | 100 |
| Compatibility | IPA | A | A | C | B | A | B | C | C | C | A | A | A | A | A | A | A | A | A |
| | MEK | A | A | C | A | A | B | C | C | B | A | A | A | A | A | A | A | A | A |
| | THF | A | A | B | A | A | A | B | A | A | A | A | A | A | A | A | A | A | A |
| | Ethyl acetate | A | A | C | A | A | A | C | C | C | A | A | A | A | A | A | A | A | A |
| | Toluene | A | A | A | B | A | A | A | A | A | A | A | A | B | A | A | A | A | A |
| | ACMO | A | B | C | A | A | B | C | C | C | A | A | B | B | A | A | A | A | A |
| | HDDA | A | B | B | A | A | B | C | C | B | A | A | B | B | A | A | A | A | A |
| | BA | A | A | A | A | A | A | A | A | A | A | A | A | A | A | A | A | A | A |

TABLE 1-continued

| | | Evaluation Examples | | | | | | | | | | | | | | | | | |
|---|---|---|---|---|---|---|---|---|---|---|---|---|---|---|---|---|---|---|---|
| | | A-1 | A-2 | A-3 | A-4 | A-5 | A-6 | A-7 | A-8 | A-9 | A-10 | A-11 | A-12 | A-13 | A-14 | A-15 | A-16 | A-17 | A-18 |
| | IBOA | A | A | A | A | A | A | A | A | A | A | A | A | A | A | A | A | A | A |
| | 2EHA | A | A | A | A | A | A | A | A | A | A | A | A | B | A | A | A | A | A |
| | THFA | A | B | B | A | A | B | B | B | B | A | A | B | B | A | A | A | A | A |

TABLE 2

| | | Evaluation Comparative Examples | | | | | |
|---|---|---|---|---|---|---|---|
| | | A-19 | A-20 | A-21 | A-22 | A-23 | A-24 |
| Urethane oligomer | UAB-1 | 100 | | | | | |
| | UAB-2 | | 100 | | | | |
| | UAB-3 | | | 100 | | | |
| | UAC-1 | | | | 100 | | |
| | UAC-2 | | | | | 100 | |
| | UAC-3 | | | | | | 100 |
| Compat-ibility | IPA | D | C | B | D | C | D |
| | MEK | B | C | A | A | A | A |
| | THF | B | B | A | A | A | B |
| | Ethyl acetate | A | B | A | A | B | A |
| | Toluene | D | C | A | D | C | D |
| | ACMO | B | D | A | C | C | D |
| | HDDA | B | D | A | D | C | D |
| | BA | B | B | A | C | B | C |
| | IBOA | A | B | A | B | B | B |
| | 2EHA | D | C | A | D | C | D |
| | THFA | D | B | A | D | A | B |

As shown in the results of Evaluation Examples A-1 to A-18 and Evaluation Comparative Examples A-19 to A-24, it was found that, if the low molecular weight component is included in an amount of more than 5% by weight in the urethane oligomer, the compatibility with a general-purpose solvent or a monomer is significantly deteriorated, and it is difficult to be widely used in optical members or the like.

Using the urethane oligomers obtained in the synthesis examples and the comparative synthesis examples, active energy ray curable resin compositions were prepared. Then, using these resin compositions, ultraviolet ray cured films were produced, and the characterization evaluation of the cured films was performed. The results are shown in Tables 3 and 4.

Evaluation Example B-1

100 parts by weight of the (meth)acrylamide-based urethane oligomer UTB-1 obtained in Synthesis Example 1, 100 parts by weight of methyl ethyl ketone (MEK), and 3 parts by weight of Darocur 1173 as a photopolymerization initiator were homogeneously mixed, whereby an active energy ray curable resin composition was prepared. Thereafter, using the obtained curable resin composition, an active energy ray curable film was produced by the following method.

Production Method of Active Energy Ray Curable Film

By applying to the anchor coat surface of a polyethylene terephthalate (PET) film ("Cosmoshine A4100" manufactured by Toyobo Co., Ltd., one side was anchor-coat-treated) having a thickness of 100 μm using a bar coater (RDS 12), a coating film was prepared such that the thickness of the dried coating film became 10 The obtained coating film was dried at 80° C. for 2 minutes in an explosion-proof dryer, and cured by UV irradiation (apparatus: spot irradiation type SUPERCURE-2045 manufactured by SAN-EI ELECTRIC CO., LTD., a mercury-xenon lamp having an output of 200 W was provided, ultraviolet ray energy of 2.7 mJ/cm² per second), whereby a UV curable film was produced. The UV curability, the tack resistance, the shrinkage resistance, the transparency, the water absorption, the adhesion, the strength, and the elongation of the obtained UV curable film were evaluated by the following methods. The results are shown in Table 3.

In the same manner, an ultraviolet ray curable film by UV-LED was manufactured as follows. The obtained coating film was cured by a UV-LED irradiator (EXECURE-H-1VC2 manufactured by HOYA CANDEO OPTRONICS CORPORATION, spot type, 385 nm) in which the distance between the coating film and the lamp was adjusted such that the ultraviolet ray energy per second became 2.7 mJ/cm², whereby a UV-LED curing film was produced. Evaluation was performed on the UV-LED curability by the following method. The results are shown in Table 3.

(5) Curability

Using the dried coating film, the resin composition was cured by the above spot type UV irradiation and the UV-LED irradiation, the required time for being completely cured was measured, and the accumulated amount of light was calculated. The complete cure means a state in which when the surface of the cured film is rubbed with silicon rubber, there is no trace.

(6) Tack Resistance

Using the completely cured coating film obtained by UV irradiation of (5), the surface of the cured film was touched with a finger, and the degree of stickiness was evaluated.

A: there was no stickiness.

B: although there was slight stickiness, trace of a finger did not remain on the surface.

C: there was stickiness, and trace of a finger remained on the surface.

D: stickiness was severe, and a finger stuck to the surface.

(7) Shrinkage Resistance

The completely cured coating film obtained by UV irradiation of (5) was used and cut into 10 cm square, then, the heights of the lifting up of the four corners were measured, and the average value was calculated.

A: lifting up was 0.5 mm or less

B: lifting up was more than 0.5 mm and 1 mm or less

C: lifting up was more than 1 mm and 3 mm or less

D: lifting up was more than 3 mm and significantly curled (8) Transparency (Visually Observed)

The completely cured coating film obtained by UV irradiation of (5) was used and visually observed, and the transparency was evaluated.

A: it was transparent, there was no cloudiness.

B: it was transparent, there was slight cloudiness.

C: although there was cloudiness, transparent portions also remained.

D: there was severe cloudiness, and a transparent portion could not be confirmed.

(9) Water Absorption

A curable resin composition was poured on a fluorine resin sheet which was hollowed such that the depth became 1 mm and vacuum-dried (50° C., 400 torr), and the resulting product was cured by UV irradiation (700 mW/cm$^2$, 2,000 mJ/cm$^2$), whereby a cured sheet was produced. The obtained sheet was cut into 3 cm square, and this was used as a test piece. The obtained test piece was allowed to stand in an environment of a temperature of 50° C. and a relative humidity of 95% for 24 hours, and then the water absorption was calculated according to Equation 1.

Water absorption (%)=(weight after constant temperature and humidity−weight before constant temperature and humidity)/weight of before constant temperature and humidity×100    (Equation 1)

(10) Adhesion

One hundred of squares of 1 mm×1 mm were manufactured using the completely cured coating film obtained by UV irradiation of (5), then, according to JIS K 5600, a cellophane tape was attached thereto, and evaluation was performed by counting the number of squares in which the coating film remained on the substrate side when the tape was peeled at once.

(11) Breaking Strength and Breaking Elongation

Measurement was performed by using the completely cured coating film obtained by UV irradiation of (5) in an environment of a temperature of 25° C. and a relative humidity of 50% according to JIS K 7127 (measurement equipment: Tensilon Universal Tester RTA-100 (manufactured by Orientec Co., Ltd.), test conditions: test speed of 10 mm/min, test piece size: gauge length of 25 mm, width of 15 mm, thickness of 50 μm).

Evaluation Examples B-2 to B-18 and Evaluation Comparative Examples B-19 to B-24

In the same manner as in Evaluation Example B-1 except that the compositions described in Tables 3 or 4 were used, an active energy ray curable resin composition was prepared, a cured film was produced, and evaluation was performed by the above method. The results are shown in Tables 3 and 4.

TABLE 3

| | | | Evaluation Examples | | | | | | | | | |
|---|---|---|---|---|---|---|---|---|---|---|---|---|
| | | | B-1 | B-2 | B-3 | B-4 | B-5 | B-6 | B-7 | B-8 | B-9 | B-10 |
| Urethane oligomer | UTB-1 | | 100 | | | | | | | | | |
| | UTB-2 | | | 100 | | | | | | | | |
| | UTB-3 | | | | 100 | | | | | | | |
| | UTB-4 | | | | | 100 | | | | | | |
| | UTB-5 | | | | | | 100 | | | | | |
| | UTB-6 | | | | | | | 100 | | | | |
| | UTB-7 | | | | | | | | 100 | | | |
| | UTB-8 | | | | | | | | | 100 | | |
| | UTB-9 | | | | | | | | | | 100 | |
| | UTB-10 | | | | | | | | | | | 100 |
| | UTC-1 | | | | | | | | | | | |
| | UTC-2 | | | | | | | | | | | |
| | UTC-3 | | | | | | | | | | | |
| | UTC-4 | | | | | | | | | | | |
| | UTC-5 | | | | | | | | | | | |
| | UTC-6 | | | | | | | | | | | |
| | UTC-7 | | | | | | | | | | | |
| Initiator | Darocur1173 | | 3 | 3 | 3 | 3 | 3 | 3 | 3 | 3 | 3 | 3 |
| Curability [mJ/cm$^2$] | | UV | 5 | 9 | 5 | 14 | 6 | 5 | 15 | 14 | 16 | 5 |
| | | UV-LED | 6 | 10 | 5 | 15 | 6 | 10 | 12 | 18 | 25 | 6 |
| Cured product characteristics | Tack resistance | | A | A | A | B | A | A | B | A | A | A |
| | Shrinkage resistance | | A | A | A | B | A | A | A | A | A | A |
| | Tranparency | | A | A | A | A | A | A | B | A | A | A |
| | Water absortion [%] | | 0.7 | 0.4 | 0.5 | 0.4 | 0.2 | 0.4 | 0.2 | 0.3 | 0.5 | 0.1 |
| | Adhesion | PET [readily adhesive] | 100/100 | 100/100 | 100/100 | 100/100 | 100/100 | 100/100 | 100/100 | 100/100 | 100/100 | 100/100 |
| | | PET [untreated] | 100/100 | 100/100 | 100/100 | 90/100 | 100/100 | 100/100 | 100/100 | 100/100 | 100/100 | 100/100 |
| | | PC | 50/100 | 70/100 | 60/100 | 40/100 | 50/100 | 70/100 | 80/100 | 100/100 | 80/100 | 40/100 |
| | | PMMA | 100/100 | 70/100 | 70/100 | 50/100 | 100/100 | 80/100 | 100/100 | 100/100 | 100/100 | 100/100 |
| | Breaking strength [N/mm] | | 28 | 38 | 15 | 12 | 45 | 35 | 22 | 25 | 32 | 30 |
| | Breaking elongation [%] | | 160 | 150 | 185 | 150 | 20 | 155 | 170 | 170 | 140 | 60 |

| | | | Evaluation Examples | | | | | | | | |
|---|---|---|---|---|---|---|---|---|---|---|---|
| | | | B-11 | B-12 | B-13 | B-14 | B-15 | B-16 | B-17 | B-18 | |
| Urethane oligomer | UTB-1 | | | | | | | | | 30 | |
| | UTB-2 | | | | | | | | | | |
| | UTB-3 | | | | | | | | | | |
| | UTB-4 | | | | | | | | | | |
| | UTB-5 | | | | | | | | | | |
| | UTB-6 | | | | | | | | | | |
| | UTB-7 | | | | | | | | | | |
| | UTB-8 | | | | | | | | | | |
| | UTB-9 | | | | | | | | | | |
| | UTB-10 | | | | | | | | | | |
| | UTC-1 | | 100 | | | | | | | 70 | |
| | UTC-2 | | | 100 | | | | | | | |

TABLE 3-continued

|  |  |  |  |  |  |  |  |  |  |
|---|---|---|---|---|---|---|---|---|---|
|  | UTC-3 |  |  | 100 |  |  |  |  |  |
|  | UTC-4 |  |  |  | 100 |  |  |  |  |
|  | UTC-5 |  |  |  |  | 100 |  |  |  |
|  | UTC-6 |  |  |  |  |  | 100 |  |  |
|  | UTC-7 |  |  |  |  |  |  |  | 100 |
| Initiator | Darocur1173 |  | 3 | 3 | 3 | 3 | 3 | 3 | 3 | 3 |
| Curability [mJ/cm²] | UV |  | 5 | 6 | 10 | 5 | 6 | 10 | 5 | 8 |
|  | UV-LED |  | 10 | 8 | 16 | 6 | 8 | 12 | 12 | 12 |
| Cured product characteristics | Tack resistance |  | A | A | B | A | A | B | A | A |
|  | Shrinkage resistance |  | A | A | A | B | A | A | A | A |
|  | Tranparency |  | A | A | B | A | A | A | A | A |
|  | Water absortion [%] |  | 0.4 | 0.2 | 0.5 | 0.4 | 0.3 | 0.7 | 0.5 | 0.7 |
|  | Adhesion | PET [readily adhesive] | 100/100 | 100/100 | 100/100 | 100/100 | 100/100 | 100/100 | 100/100 | 100/100 |
|  |  | PET [untreated] | 100/100 | 100/100 | 100/100 | 100/100 | 100/100 | 100/100 | 100/100 | 100/100 |
|  |  | PC | 100/100 | 100/100 | 100/100 | 100/100 | 100/100 | 80/100 | 80/100 | 100/100 |
|  |  | PMMA | 90/100 | 70/100 | 90/100 | 60/100 | 90/100 | 60/100 | 90/100 | 100/100 |
|  | Breaking strength [N/mm] |  | 31 | 33 | 25 | 45 | 32 | 20 | 30 | 15 |
|  | Breaking elongation [%] |  | 160 | 120 | 180 | 20 | 130 | 200 | 130 | 190 |

TABLE 4

|  |  |  | Evaluation Comparative Examples | | | | | |
|---|---|---|---|---|---|---|---|---|
|  |  |  | B-19 | B-20 | B-21 | B-22 | B-23 | B-24 |
| Urethane oligomer | UAB-1 |  | 100 |  |  |  |  |  |
|  | UAB-2 |  |  | 100 |  |  |  |  |
|  | UAB-3 |  |  |  | 100 |  |  |  |
|  | UAC-1 |  |  |  |  | 100 |  |  |
|  | UAC-2 |  |  |  |  |  | 100 |  |
|  | UAC-3 |  |  |  |  |  |  | 100 |
| Initiator | Darocur1173 |  | 3 | 3 | 3 | 3 | 3 | 3 |
| Curability [mJ/cm²] | UV |  | 33 | 28 | >55 | 35 | 30 | >55 |
|  | UV-LED |  | >55 | >55 | >55 | >55 | >55 | >55 |
| Cured product characteristics | Tack resistance |  | D | C | C | D | C | D |
|  | Shrinkage resistance |  | C | C | B | C | C | D |
|  | Tranparency |  | C | C | A | D | D | C |
|  | Water absorption [%] |  | 3.2 | 2.5 | 0.6 | 3.6 | 2.4 | 4.8 |
|  | Adhesion | PET (readily adhesive) | 80/100 | 90/100 | 100/100 | 80/100 | 90/100 | 85/100 |
|  |  | PET (untreated) | 0/100 | 0/100 | 90/100 | 0/100 | 0/100 | 0/100 |
|  |  | PC | 0/100 | 0/100 | 50/100 | 70/100 | 80/100 | 60/100 |
|  |  | PMMA | 0/100 | 0/100 | 50/100 | 0/100 | 0/100 | 0/100 |
|  | Breaking strength [N/mm] |  | 22 | 15 | 12 | 12 | 20 | 10 |
|  | Breaking elongation [%] |  | 40 | 105 | 120 | 100 | 105 | 80 |

As shown in the results of the evaluation examples and the evaluation comparative examples, in a urethane oligomer including more than 5% by weight of a low molecular weight component, much time and energy are required for curing, the obtained cured product is poor in tack resistance, shrinkage resistance and water absorption. The present inventors think that this is because the low molecular weight component is a high polar component, the polarity of the urethane oligomer also increases overall by containing the low molecular weight compound, and the adhesion is lowered. It is possible to obtain a resin composition in which the (meth)acrylamide-based urethane oligomer of the present invention contains 5% by weight or less of the low molecular weight component having a molecular weight of less than 1,000, excellent curability is exhibited even using a UV lamp or an LED lamp as an active energy ray light source, the tack resistance, the shrinkage resistance, the transparency, and the water absorption of the obtained cured product are good, and the adhesion to a PET untreated surface, PC, or PMMA is improved.

The characteristics evaluation in each field of application was performed on the urethane oligomers obtained in Synthesis Examples 1 to 17 and Comparative Synthesis Examples 1 to 6. The materials used in the examples and the comparative examples are as follows.

"HEAA"; hydroxyethyl acrylamide (manufactured by KJ Chemicals Corporation)
"DMAA"; N,N-dimethyl acrylamide (manufactured by KJ Chemicals Corporation)
"DEAA"; N,N-diethyl acrylamide (manufactured by KJ Chemicals Corporation)
"ACMO"; N-acryloylmorpholine (manufactured by KJ Chemicals Corporation)
"DMAPAA"; dimethylaminopropyl acrylamide (manufactured by KJ Chemicals Corporation)
HEA; hydroxyethyl acrylate
4HBA; 4-hydroxybutyl acrylate
2EHA; 2-ethylhexyl acrylate
EEA; 2-(2-ethoxyethoxy)ethyl acrylate THFA; tetrahydrofurfuryl acrylate
IBOA; isobornyl acrylate
CHA; cyclohexyl acrylate
M-106; o-phenylphenol EO modified acrylate (manufactured by Toagosei Chemical Industry Co., Ltd.)
HDDA; 1,6-hexanediol diacrylate
TPGDA; tripropylene glycol diacrylate
PETA; pentaerythritol triacrylate
DPHA; dipentaerythritol hexaacrylate
UV-1700; decafunctional urethane acrylate (manufactured by Nippon Synthetic Chemicals Industry Co., Ltd.)
UV-7600; hexafunctional urethane acrylate (manufactured by Nippon Synthetic Chemicals Industry Co., Ltd.)
DMAEA-TFSIQ; acryloyloxyethyltrimethyl ammonium bis(trifluoromethanesulfonyl)imide (manufactured by KJ Chemicals Corporation)
DMAPAA-TFSIQ; acryloylaminopropyltrimethyl ammonium bis(trifluoromethanesulfonyl)imide (manufactured by KJ Chemicals Corporation)
PET-untreated substrate: polyester sheet ("Cosmoshine A4100" manufactured by Toyobo Co., Ltd., anchor coat-untreated surface)
PET-readily adhesive substrate: polyester sheet ("Cosmoshine A4100" manufactured by Toyobo Co., Ltd., anchor coat-treated surface)
PC board: polycarbonate sheet
PMMA: acrylic resin sheet
COP: cyclic olefin polymer film Evaluation Example C-1

22 parts by weight of the (meth)acrylamide-based urethane oligomer UTB-1 synthesized in Synthesis Example 1, 10 parts by weight of "HEAA", 40 parts by weight of 2EHA, 7 parts by weight of CHA, 20 parts by weight of EEA, and 1 part by weight of DMAEA-TFSIQ were mixed, then, 3 parts by weight of Irgacure 184 as a photopolymerization initiator was added thereto, and the resulting product was homogeneously mixed, whereby an ultraviolet ray curable pressure sensitive adhesive was prepared. Thereafter, using the obtained pressure sensitive adhesive, an ultraviolet ray curable type pressure sensitive adhesive sheet was produced by UV irradiation by the following method, and evaluation thereof was performed.

Production Method of Ultraviolet Ray Curable Type Pressure Sensitive Adhesive Sheet The ultraviolet ray curable type pressure sensitive adhesive prepared in the above was applied to a heavy peeling separator (silicone coated PET film), then, using a desktop type roll laminator (RSL-382S manufactured by Royal Sovereign), a light peeling separator (silicone coated PET film) was attached thereto such that the thickness of the adhesive layer became 25 µm and air bubbles were not to be bitten, and irradiation (apparatus: inverter type conveyor system ECS-4011GX manufactured by Eye Graphics Co., Ltd., metal halide lamp: M04-L41 manufactured by Eye Graphics Co., Ltd., ultraviolet illumination: 700 mW/cm$^2$, cumulative amount of light: 1,000 mJ/cm$^2$) with ultraviolet rays was performed, whereby an optical transparent pressure sensitive adhesive sheet was obtained. The characteristics of the obtained pressure sensitive adhesive sheet were evaluated by the following methods. The results are shown in Table 5.

(12) Transparency (Transmittance)

Under conditions of a temperature of 23° C. and a relative humidity of 50%, the surface from which the light peeling separator had been peeled, of the pressure sensitive adhesive sheet cut into a shape with a width of 25 mm was attached to a glass substrate as an adherend, then, a heavy peeling separator was peeled, and the transmittance was measured. After the total light transmittance of the glass substrate was measured using a haze meter (NDH-2000 manufactured by Nippon Denshoku Industries Co., Ltd.) according to JIS K 7105, by subtracting the transmittance of the glass plate, the transmittance of the pressure sensitive adhesive layer itself was calculated, and the transparency was evaluated as a numerical value. As the transmittance was higher, the transparency was better.

(13) Measurement of Surface Resistivity

Using a template (vertical 110×horizontal 110 mm), the pressure sensitive adhesive sheet was cut with a cutter knife, and the cut pressure sensitive adhesive sheets were put in a thermostatic and humidistatic apparatus adjusted to a temperature of 23° C. and a relative humidity of 50% and allowed to stand for 3 hours, whereby a sample for surface resistivity measurement was obtained. The surface resistivity was measured using a digital electrometer (R8252 type: manufactured by ADC CORPORATION) according to JIS K 6911.

(14) Adhesive Force

Under conditions of a temperature of 23° C. and a relative humidity of 50%, a pressure sensitive adhesive sheet was transferred to a polyethylene terephthalate (PET) film (thickness of 100 µm) or a glass substrate as an adherend, and by reciprocatively moving two times a pressure roller of a load of 2 kg, pressure-attachment was performed, and the resulting product was allowed to stand for 30 minutes in the same environment. Thereafter, using a tension tester (apparatus name: Tensilon RTA-100 manufactured by ORIENTEC Co., Ltd.), the 180° peeling resistance (N/25 mm) was measured at a peeling rate of 300 mm/min.

A: 30 (N/25 mm) or greater
B: 15 (N/25 mm) or greater and less than 30 (N/25 mm)
C: 8 (N/25 mm) or greater and less than 15 (N/25 mm)
D: less than 8 (N/25 mm)

(15) Contamination Resistance

A pressure sensitive adhesive sheet was attached to an adherend in the same manner as in the measurement of adhesive force described above, then, the resulting product was allowed to stand at 80° C. for 24 hours, and contamination of the adherend surface after the pressure sensitive adhesive sheet was peeled was visually observed.

A: there is no contamination
B: there is very slight contamination
C: there is slight contamination
D: there are glue (pressure sensitive adhesive) residues.

(16) Yellowing Resistance

A pressure sensitive adhesive sheet was attached to a glass substrate, then, this was set to a xenon fade meter (SC-700-WA: manufactured by Suga Test Instruments Co., Ltd.), and after irradiation with ultraviolet rays was performed at an intensity of 70 mW/cm$^2$ for 120 hours, the color change of the pressure sensitive adhesive sheet was visually observed.

A: yellowing cannot be visually observed at all.
B: yellowing can be very slightly visually observed.
C: yellowing can be visually observed.
D: obvious yellowing can be visually observed.

(17) Moisture and Heat Resistance

A pressure sensitive adhesive sheet was attached to a glass substrate in the same manner as in the yellowing resistance test described above, and an occurrence of floating-peeling, bubbles, or cloudiness after the pressure sensitive adhesive sheet attached to a glass substrate was kept for 100 hours under conditions of a temperature of 85° C. and a relative humidity of 85% was visually observed, and from this, evaluation was performed.

A: it is transparent, and floating-peeling and bubble do not occur.

B: although there is very slight cloudiness, floating-peeling and bubble do not occur.

C: there is slight cloudiness or float-peeling, and there are bubbles.

D: there is severe cloudiness or float-peeling, and there are bubbles.

(18) Step Followability

A black tape having a thickness of 20 μm was attached to a glass substrate, whereby a stepped glass was produced. After a pressure sensitive adhesive sheet was transferred to the stepped glass, by reciprocating once (pressing speed of 300 mm/min) using a roller of a load of 2 kg in an environment of a temperature of 23° C. and a relative humidity of 50%, pressure-attachment was performed, then, the resulting product was allowed to stand at a temperature of 80° C. for 24 hours, and the state of the stepped portion was observed using an optical microscope.

A: bubble is not observed at all

B: slightly small spherical bubbles are observed

C: large bubbles are observed, and there is a case where bubbles are linked with each other D: large bubbles are linked with each other, and spread on the line in the stepped portion

(19) Punching Processability

The obtained pressure sensitive adhesive sheet was cut by a Thompson punching method (punching method by punching blades, in which 10 linear blades were arranged at 5.0 mm intervals in parallel).

A: nothing remained on the punching blades.

B: slight pressure sensitive adhesive remained on the punching blades.

C: pressure sensitive adhesive remains on the punching blades.

D: pressure sensitive adhesive significantly remains on the punching blades, and cutting surface can not be clearly observed.

Evaluation Examples C-2 to 20 and Evaluation Comparative Examples C-21 to 25

In the same manner as in Evaluation Example C-1 except that the compositions described in Tables 5 to 7 were used, an ultraviolet ray curable resin was prepared, a pressure sensitive adhesive sheet was produced, and evaluation was performed thereon by the above method. The results are shown in Tables 5 to 7.

TABLE 5

|  |  | Evaluation Examples | | | | | | | | | | |
|---|---|---|---|---|---|---|---|---|---|---|---|
|  |  | C-1 | C-2 | C-3 | C-4 | C-5 | C-6 | C-7 | C-8 | C-9 | C-10 | C-11 |
| Urethane oligomer | UTB-1 | 22 | 67 | | | | | | | | | |
|  | UTB-2 | | | 55 | | | | | | | | |
|  | UTB-3 | | | | 12 | | | | | | | |
|  | UTB-4 | | | | | 40 | | | | | | |
|  | UTB-5 | | | | | | 77 | | | | | |
|  | UTB-6 | | | | | | | 45 | | | | |
|  | UTB-7 | | | | | | | | 23 | | | |
|  | UTB-8 | | | | | | | | | 40 | | |
|  | UTB-9 | | | | | | | | | | 50 | |
|  | UTB-10 | | | | | | | | | | | 58 |
| Other monomers | "HEAA" | 10 | | 18 | 28 | 20 | | 20 | 7 | 18 | 11 | 12 |
|  | "DEAA" | | 15 | | | 18 | 15 | | 25 | 15 | | 18 |
|  | 2EHA | 40 | 10 | 14 | 28 | | | 23 | 30 | 20 | 20 | |
|  | CHA | 7 | | | 9 | | 5 | | | | | |
|  | EEA | 20 | 8 | 10 | 18 | 14 | | 7 | 5 | | 14 | 7 |
| Ionic vinyl monomer | DMAEA-TFSIQ | 1 | | 3 | | | 3 | 5 | | | | |
|  | DMAPAA-TFSIQ | | | | | 5 | 8 | | | 10 | 7 | 5 | 5 |
| Initiator | Irgacure 184 | 3 | 3 | 3 | 3 | 3 | 3 | 3 | 3 | 3 | 3 | 3 |
| Pressure sensitive adhesive sheet characteristics | Transmittance (%) | 100 | 100 | 100 | 100 | 100 | 100 | 100 | 100 | 100 | 100 | 100 |
|  | Surface resistivity value (Ω/sq) | $4.2 \times 10^{10}$ | $6.5 \times 10^{13}$ | $7.2 \times 10^{9}$ | $8.4 \times 10^{8}$ | $3.8 \times 10^{7}$ | $2.1 \times 10^{10}$ | $8.6 \times 10^{8}$ | $3.5 \times 10^{7}$ | $4.4 \times 10^{7}$ | $2.1 \times 10^{8}$ | $3.6 \times 10^{9}$ |
|  | Adhesive force PET | A | A | A | A | B | A | A | A | A | A | A |
|  | Adhesive force Glass | A | B | A | A | A | B | A | A | A | A | B |
|  | Contamination resistance PET | A | A | A | A | B | A | A | A | A | A | A |
|  | Contamination resistance Glass | A | A | A | A | B | B | A | A | A | A | B |
|  | Yellowing resistance | A | A | A | A | A | A | A | A | A | A | A |
|  | Moisture and heat resistance | A | A | A | B | B | A | B | A | A | A | A |
|  | Step followability | A | A | A | A | A | B | A | A | B | A | B |
|  | Punching processability | A | A | A | B | B | A | B | A | A | A | A |

TABLE 6

|  |  | Evaluation Examples | | | | | | | | |
|---|---|---|---|---|---|---|---|---|---|---|
|  |  | C-12 | C-13 | C-14 | C-15 | C-16 | C-17 | C-18 | C-19 | C-20 |
| Urethane oligomer | UTC-1 | 12 | 58 | | | | | | 42 | |
|  | UTC-2 | | | 35 | | | | | | |
|  | UTC-3 | | | | 65 | | | | | |
|  | UTC-4 | | | | | 40 | | | | |
|  | UTC-5 | | | | | | 50 | | | |

TABLE 6-continued

|  |  | Evaluation Examples | | | | | | | | |
|---|---|---|---|---|---|---|---|---|---|---|
|  |  | C-12 | C-13 | C-14 | C-15 | C-16 | C-17 | C-18 | C-19 | C-20 |
|  | UTC-6 |  |  |  |  |  |  | 53 |  |  |
|  | UTC-7 |  |  |  |  |  |  |  |  | 77 |
|  | UTB-1 |  |  |  |  |  |  |  | 20 |  |
| Other monomers | "HEAA" | 10 |  |  | 18 | 20 | 10 | 9 | 15 |  |
|  | "DEAA" |  | 24 | 23 |  | 16 | 10 | 25 | 8 | 15 |
|  | 2EHA | 35 | 10 | 21 | 7 |  | 15 |  |  |  |
|  | CHA | 23 |  |  |  |  |  |  |  | 5 |
|  | EEA | 20 | 8 | 18 | 5 | 14 | 15 | 10 | 10 |  |
| Ionic vinyl monomer | DMAEA-TFSIQ |  |  | 3 |  |  |  |  | 5 | 3 |
|  | DMAPAA-TFSIQ |  |  |  | 5 | 10 |  | 3 |  |  |
| Initiator | Irgacure 184 | 3 | 3 | 3 | 3 | 3 | 3 | 3 | 3 | 3 |
| Pressure sensitive adhesive sheet characteristics | Transmittance (%) | 100 | 100 | 100 | 100 | 100 | 100 | 100 | 100 | 100 |
|  | Surface resistivity value ($\Omega$/sq) | $7.2 \times 10^{12}$ | $2.2 \times 10^{13}$ | $7.0 \times 10^{9}$ | $8.1 \times 10^{8}$ | $2.2 \times 10^{7}$ | $6.6 \times 10^{11}$ | $8.0 \times 10^{9}$ | $2.5 \times 10^{8}$ | $9.1 \times 10^{9}$ |
|  | Adhesive force  PET | A | A | A | A | B | A | A | A | A |
|  |  Glass | A | B | B | B | A | A | B | A | B |
|  | Contamination resistance  PET | A | A | B | B | B | A | B | A | A |
|  |  Glass | A | A | A | B | A | A | B | A | B |
|  | Yellowing resistance | A | A | A | A | A | A | A | A | A |
|  | Moisture and heat resistance | A | A | A | B | A | A | A | A | B |
|  | Step followability | A | A | B | A | B | A | A | A | A |
|  | Punching processability | A | A | A | B | A | A | B | A | B |

TABLE 7

|  |  | Evaluation Comparative Examples | | | | |
|---|---|---|---|---|---|---|
|  |  | C-21 | C-22 | C-23 | C-24 | C-25 |
| Urethane oligomer | UAB-1 | 25 |  |  |  |  |
|  | UAB-2 |  | 64 |  |  |  |
|  | UAC-1 |  |  | 65 |  |  |
|  | UAC-2 |  |  |  | 40 |  |
|  | UAC-3 |  |  |  |  | 55 |
| Other monomers | "HEAA" | 10 | 13 | 6 | 18 | 12 |
|  | "DEAA" | 22 | 13 |  | 24 | 20 |
|  | 2EHA | 24 |  | 18 |  |  |
|  | CHA |  |  |  |  | 8 |
|  | EEA | 14 | 10 | 8 | 13 |  |
| Ionic vinyl monomer | DMAEA-TFSIQ | 5 |  | 3 | 5 | 5 |
|  | DMAPAA-TFSIQ |  |  |  |  |  |
| Initiator | Irgacure 184 | 3 | 3 | 3 | 3 | 3 |
| Pressure sensitive adhesive sheet characteristics | Transmittance (%) | 92 | 89 | 90 | 93 | 78 |
|  | Surface resistivity value ($\Omega$/sq) | $9.2 \times 10^{9}$ | $5.8 \times 10^{14}$ | $1.1 \times 10^{10}$ | $3.5 \times 10^{9}$ | $8.8 \times 10^{9}$ |
|  | Adhesive force  PET | C | C | C | C | C |
|  |  Glass | D | C | D | D | D |
|  | Contamination resistance  PET | C | C | C | C | D |
|  |  Glass | D | D | D | D | D |
|  | Yellowing resistance | B | B | B | C | B |
|  | Moisture and heat resistance | D | C | D | C | D |
|  | Step followability | D | C | C | D | B |
|  | Punching processability | C | D | D | C | D |

As shown in the results of the evaluation examples and the evaluation comparative examples, in a urethane oligomer including more than 5% by weight of a component having a molecular weight less than 1,000, transparency, adhesive force, and moisture and heat resistance tended to deteriorate, and contamination resistance and punching processability of the pressure sensitive adhesive sheet after curing were poor, and thus, the oligomer was difficult to be used. In the (meth)acrylamide-based urethane oligomer of the present invention, it was possible to obtain a pressure sensitive adhesive sheet which has high transparency and adhesive force, and has excellent contamination resistance and punching processability.

Evaluation Example D-1

20 parts by weight of the (meth)acrylamide-based urethane oligomer UTB-1 synthesized in Synthesis Example 1, 40 parts by weight of "DEAA", 25 parts by weight of M-106, 10 parts by weight of 4-HBA, and 5 parts by weight of "HEAA" were mixed, then, 3 parts by weight of Darocur 1173 as a photopolymerization initiator was added thereto, and the resulting product was homogeneously mixed, whereby an ultraviolet ray curable sealant was prepared. Thereafter, using the obtained sealant, a sealant resin cured product was produced by ultraviolet ray curing by the following method, and the physical properties thereof were evaluated.

Production Method of Ultraviolet Ray Curable Type Sealant Resin Cured Product

A silicon spacer (vertical 30 mm×horizontal 15 mm×thickness 3 mm) was set on a glass plate (vertical 50 mm×horizontal 50 mm×thickness 5 mm), and the ultraviolet ray curable type sealant prepared above was injected into the inside of the spacer. After thoroughly degassing, by performing irradiation (apparatus: inverter type conveyor system ECS-4011GX manufactured by Eye Graphics Co., Ltd., metal halide lamp: M04-L41 manufactured by Eye Graphics Co., Ltd., ultraviolet illumination: 700 mW/cm$^2$, cumulative amount of light: 1,000 mJ/cm$^2$) with ultraviolet rays, a sealant resin cured product was produced. The characteristics of the obtained cured product were evaluated by the following methods. The results are shown in Table 8.

(20) Transparency (Transmittance)

The obtained cured product was used and allowed to stand in an environment of a temperature of 23° C. and a relative humidity of 50% for 24 hours. Thereafter, the transmittance of the cured film was measured using a haze meter (NDH-2000 manufactured by Nippon Denshoku Industries Co., Ltd.), and the transparency was evaluated on a scale of four stages described below.

A: transmittance is 90% or greater
B: transmittance is 85% or greater and less than 90%
C: transmittance is 50% or greater and less than 85%
D: transmittance is less than 50%

(21) Light Resistance

The obtained cured product was attached to a glass substrate, and the degree of yellow was measured using a spectrophotometer (CM-3600d: manufactured by Konica Minolta, Inc.). Thereafter, the cured product attached to a glass substrate was set to a xenon fade meter (SC-700-WA: manufactured by Suga Test Instruments Co., Ltd.), and after irradiation with ultraviolet rays was performed at an intensity of 4 W/cm$^2$ at 30° C. for 100 hours, the degree of yellow after the irradiation was measured in the same manner as before the irradiation, and the color change of the cured product was visually observed.

A: yellowing cannot be visually observed at all.
B: yellowing can be very slightly visually observed.
C: yellowing can be visually observed.
D: obvious yellowing can be visually observed.

(22) Water Absorption Test 1 g was taken from the obtained cured product, set in a thermostatic and humidistatic apparatus of a temperature 85° C. and a relative humidity of 95% as a test piece, and allowed to stand for 48 hours, then, the test piece was weighed again, and the water absorption was calculated in the same manner as in the evaluation item (9).

A: water absorption is less than 1.0%
B: water absorption is 1.0% or greater and less than 2.0%
C: water absorption is 2.0% or greater and less than 3.0%
D: water absorption is 3.0% or greater

(23) Outgas Test

After 1 g was taken from the obtained cured product and allowed to stand in a thermostat set to a temperature of 100° C. as a test piece, dry nitrogen was flowed thereinto for 24 hours, then, the test piece was weighed again, and the outgas generation ratio was calculated by (Equation 2).

Outgas generation ratio (%)=(weight after constant temperature−weight before constant temperature)/weight before constant temperature×100   (Equation 2)

A: generation ratio is less than 0.1%
B: generation ratio is 0.1% or greater and less than 0.3%
C: generation ratio is 0.3% or greater and less than 1.0%
D: generation ratio is 1.0% or greater

(24) Heat Cycle Resistance

A cycle in which the obtained cured product was allowed to stand at −40° C. for 30 minutes, and then at 100° C. for 30 minutes was repeated 100 times, and the state of the cured product was visually observed.

A: change is not observed at all
B: although bubbles slightly occurs, occurrence of cracks is not observed.
It was transparent.
C: occurrence of some of bubbles or cracks is observed, and there is slight cloudiness.
D: bubbles or cracks fully occurs, and it is a semi-transparent state.

Evaluation Examples D-2 to 18 and Evaluation Comparative Examples D-19 to 24

In the same manner as in Evaluation Example D-1 except that the compositions described in Tables 8 and 9 were used, an ultraviolet ray curable resin was prepared, a sealant resin cured product was produced, and evaluation was performed thereon by the above method. The results are shown in Tables 8 and 9.

TABLE 8

| | | Evaluation Examples | | | | | | | | | |
|---|---|---|---|---|---|---|---|---|---|---|---|
| | | D-1 | D-2 | D-3 | D-4 | D-5 | D-6 | D-7 | D-8 | D-9 | D-10 |
| Urethane oligomer | UTB-1 | 20 | | | | | | | | | |
| | UTB-2 | | 5 | | | | | | | | |
| | UTB-3 | | | 35 | | | | | | | |
| | UTB-4 | | | | 50 | | | | | | |
| | UTB-5 | | | | | 40 | | | | | |
| | UTB-6 | | | | | | 10 | | | | |
| | UTB-7 | | | | | | | 70 | | | |
| | UTB-8 | | | | | | | | 15 | | |
| | UTB-9 | | | | | | | | | 25 | |
| | UTB-10 | | | | | | | | | | 30 |
| | UTC-1 | | | | | | | | | | |
| | UTC-2 | | | | | | | | | | |
| | UTC-3 | | | | | | | | | | |
| | UTC-4 | | | | | | | | | | |
| | UTC-5 | | | | | | | | | | |
| | UTC-6 | | | | | | | | | | |
| | UTC-7 | | | | | | | | | | |

TABLE 8-continued

| | | D-1 | D-2 | D-3 | D-4 | D-5 | D-6 | D-7 | D-8 | D-9 | D-10 |
|---|---|---|---|---|---|---|---|---|---|---|---|
| Other monomers | "ACMO" | | 20 | | | 10 | 40 | | 20 | 50 | |
| | "HEAA" | 5 | | 20 | | | | 3 | 10 | | 15 |
| | "DMAA" | | | 35 | | | 5 | | 5 | 5 | |
| | "DEAA" | 40 | 25 | | 20 | 10 | | 10 | 10 | | 30 |
| | 4HBA | 10 | | | 15 | 5 | 5 | | | 10 | |
| | EEA | | 30 | | | | 30 | | 20 | | 15 |
| | M-106 | 25 | | | | 20 | | | | 10 | |
| | THFA | | 20 | | 15 | | 10 | | 20 | | |
| | IBOA | | | 10 | | 15 | | 17 | | | 10 |
| Initiator | Darocur 1173 | 3 | 3 | 3 | 3 | 3 | 3 | 3 | 3 | 3 | 3 |
| Sealant cured product characteristics | Transmittance (%) | A | A | A | A | A | A | B | A | A | A |
| | Light resistance | A | A | A | A | A | A | A | A | A | A |
| | Water absorption test | A | B | A | A | A | A | A | A | B | A |
| | Outgas generation evaluation | A | A | A | A | A | B | A | A | A | A |
| | Heat cycle resistance | A | A | A | A | A | B | A | A | A | A |

| | | Evaluation Examples | | | | | | | |
|---|---|---|---|---|---|---|---|---|---|
| | | D-11 | D-12 | D-13 | D-14 | D-15 | D-16 | D-17 | D-18 |
| Urethane oligomer | UTB-1 | | | | | | | | |
| | UTB-2 | | | | | | | 15 | |
| | UTB-3 | | | | | | | | |
| | UTB-4 | | | | | | | | |
| | UTB-5 | | | | | | | | |
| | UTB-6 | | | | | | | | |
| | UTB-7 | | | | | | | | |
| | UTB-8 | | | | | | | | |
| | UTB-9 | | | | | | | | |
| | UTB-10 | | | | | | | | |
| | UTC-1 | 45 | | | | | | | |
| | UTC-2 | | 40 | | | | 35 | | |
| | UTC-3 | | | 25 | | | | | |
| | UTC-4 | | | | 30 | | | | |
| | UTC-5 | | | | | 25 | | | |
| | UTC-6 | | | | | | | 90 | |
| | UTC-7 | | | | | | | | 25 |
| Other monomers | "ACMO" | | 15 | | 30 | 20 | | | 15 |
| | "HEAA" | 25 | 10 | 10 | | 40 | 5 | 5 | |
| | "DMAA" | 20 | | | | 10 | | 5 | 15 |
| | "DEAA" | | 15 | 50 | 20 | | 20 | | |
| | 4HBA | | | 5 | 10 | | | | 20 |
| | EEA | | | | | | 10 | | |
| | M-106 | 10 | | | 10 | 5 | | | |
| | THFA | | 20 | | | | 15 | | 25 |
| | IBOA | | | 10 | | | | | |
| Initiator | Darocur 1173 | 3 | 3 | 3 | 3 | 3 | 3 | 3 | 3 |
| Sealant cured product characteristics | Transmittance (%) | A | A | A | A | B | A | A | A |
| | Light resistance | A | A | B | A | A | A | A | A |
| | Water absorption test | A | A | A | A | B | A | A | A |
| | Outgas generation evaluation | A | A | A | A | A | A | A | A |
| | Heat cycle resistance | A | A | A | A | B | A | C | A |

TABLE 9

| | | Evaluation Comparative Examples | | | | | |
|---|---|---|---|---|---|---|---|
| | | D-19 | D-20 | D-21 | D-22 | D-23 | D-24 |
| Urethane oligomer | UAB-1 | 20 | | | | | |
| | UAB-2 | | 35 | | | | |
| | UAB-3 | | | 50 | | | |
| | UAC-1 | | | | 30 | | |
| | UAC-2 | | | | | 40 | |
| | UAC-3 | | | | | | 35 |
| Other monomers | "ACMO" | | 40 | 10 | | 10 | 20 |
| | "DEAA" | 40 | 15 | | 20 | | 10 |
| | 4HBA | 10 | | 30 | 25 | 5 | 5 |
| | M-106 | 30 | | | 25 | 20 | |
| | IBOA | | 10 | 10 | | 25 | 30 |

TABLE 9-continued

|  |  | Evaluation Comparative Examples | | | | | |
| --- | --- | --- | --- | --- | --- | --- | --- |
|  |  | D-19 | D-20 | D-21 | D-22 | D-23 | D-24 |
| Initiator | Darocur 1173 | 3 | 3 | 3 | 3 | 3 | 3 |
| Sealant | Transmittance (%) | D | D | A | D | D | D |
| cured product | Light resistance | D | C | D | D | C | B |
| characteristics | Water absorption test | C | C | C | C | B | C |
|  | Outgas generation evaluation | C | D | C | C | C | B |
|  | Heat cycle resistance | D | B | D | D | D | D |

As shown in the results of the evaluation examples and the evaluation comparative examples, in a case where a urethane oligomer including more than 5% by weight of a component having a molecular weight less than 1,000 was blended, the transparency, the light resistance or the heat cycle resistance of the obtained cured product was decreased over time, and the water absorption was also high. On the other hand, in a case where a urethane oligomer including 5% or less by weight of a component having a molecular weight less than 1,000 of the present invention was used, the obtained cured product was excellent in all of the required characteristics, and thus, the cured product can be widely used as a sealant of electronic parts, semiconductors, a solar cell, and the like.

Evaluation Example E-1

12 parts by weight of the (meth)acrylamide-based urethane oligomer UTB-1 synthesized in Synthesis Example 1, 25 parts by weight of ACMO, 23 parts by weight of DMAA, 25 parts by weight of HEA, and 15 parts by weight of THFA were mixed, then, 3 parts by weight of Darocur 1173 as a photopolymerization initiator was added thereto, and the resulting product was homogeneously mixed, whereby an ultraviolet ray curable adhesive was prepared. Thereafter, using the obtained adhesive, a polarizing plate was produced by ultraviolet ray curing by the following method, and the physical properties of the polarizing plate were evaluated. The results are shown in Table 10.

Production of Polarizing Plate by UV Irradiation

Using a desktop type roll laminator (RSL-382S manufactured by Royal Sovereign), a polarizing film was sandwiched between two sheets of transparent films (protective film, phase difference film or optical compensation film), and the adhesive of the example or the comparative example was applied between the transparent film and the polarizing film such that the thickness became 10 By performing irradiation (apparatus: inverter type conveyor system ECS-4011GX manufactured by Eye Graphics Co., Ltd., metal halide lamp: M04-L41 manufactured by Eye Graphics Co., Ltd., ultraviolet illumination: 700 mW/cm$^2$, cumulative amount of light: 1,000 mJ/cm$^2$) with ultraviolet rays from the upper surface of the attached transparent film, a polarizing film having a transparent film on both sides of the polarizing film were produced. In addition, as the transparent film, an acryl-based (ACR) protective film (Sunduren SD-014 manufactured by KANEKA CORPORATION), a cyclic olefin-based (COP) protective film (ZeonorFilm ZF16 manufactured by Nippon Zeon Corp.) and a triacetyl cellulose-based (TAC) protective film (phase difference film n-TAC using a polymer having a cellulose ester as a main component manufactured by Konica Minolta Opto, Inc.) were used.

(25) Surface Shape Observation

The surface of the obtained polarizing plate was visually observed, and evaluation was performed according to the following criteria.

A: fine streaks and irregularity cannot be observed on the surface of the polarizing plate.

B: fine streaks can be partly observed on the surface of the polarizing plate.

C: fine streaks or irregularity can be observed on the surface of the polarizing plate.

D: obvious streaks or irregularity can be observed on the surface of the polarizing plate

(26) Peeling Resistance

Under conditions of a temperature of 23° C. and a relative humidity of 50%, a polarizing plate (test piece) cut into 20 mm×150 mm was attached to a test plate attached to a tension tester (Autograph AGXS-X SOON manufactured by Shimadzu Corporation) with a double-sided adhesive tape. A piece of transparent protective film and polarizing film on the side which was not attached with a double-sided adhesive tape was peeled at about 20 to 30 mm in advance and chucked to an upper clamping tool, and the 90° peeling resistance (N/20 mm) was measured at a peeling rate of 300 mm/min.

A: 3.0 (N/20 mm) or greater

B: 1.5 (N/20 mm) or greater and less than 3.0 (N/20 mm)

C: 1.0 (N/20 mm) or greater and less than 1.5 (N/20 mm)

D: less than 1.0 (N/20 mm)

(27) Water Resistance

The obtained polarizing plate was cut into 20×80 mm, then, this was soaked in warm water at 60° C. for 48 hours, and the presence or absence of peeling at the interfaces between the polarizer and the protective film, the phase difference film, and the optical compensation film was observed. Determination was performed according to the following criteria.

A: there is no peeling at the interface between the polarizer and the protective film (less than 1 mm).

B: there is peeling at a part of the interface between the polarizer and the protective film (1 mm or greater and less than 3 mm).

C: there is peeling at a part of the interface between the polarizer and the protective film (3 mm or greater and less than 5 mm).

D: there is peeling at the interface between the polarizer and the protective film (5 mm or greater).

(28) Durability

After the obtained polarizing plate was cut into 150 mm×150 mm, the cut polarizing plate was put into a thermal shock apparatus (TSA-101L-A manufactured by ESPEC CORP.), then, heat shock at −40° C. to 80° C. was performed 100 times for 30 minutes, respectively, and evaluation was performed according to the following criteria.

A: cracks do not occur.

B: short cracks of 5 mm or smaller occur only at the ends.

C: cracks occur in a short linear shape at places other than the ends. However, by the line, the polarizing plate is not separated into two or more portions.

D: cracks occur at places other than the ends. By the line, the polarizing plate is separated into two or more portions.

Evaluation Examples E-2 to 20 and Evaluation Comparative Examples D-21 to 26

In the same manner as in Evaluation Example E-1 except that the compositions described in Tables 10 and 12 were used, an ultraviolet ray curable resin was prepared, a polarizing plate was produced, and evaluation was performed thereon by the above method. The results are shown in Tables 10 and 12.

TABLE 10

| | | | Evaluation Examples | | | | | | | | | | |
|---|---|---|---|---|---|---|---|---|---|---|---|---|---|
| | | | E-1 | E-2 | E-3 | E-4 | E-5 | E-6 | E-7 | E-8 | E-9 | E-10 | E-11 |
| Urethane oligomer | | UTB-1 | 12 | 30 | | | | | | | | | |
| | | UTB-2 | | | 35 | | | | | | | | |
| | | UTB-3 | | | | 55 | | | | | | | |
| | | UTB-4 | | | | | 20 | | | | | | |
| | | UTB-5 | | | | | | 28 | | | | | |
| | | UTB-6 | | | | | | | 30 | | | | |
| | | UTB-7 | | | | | | | | 25 | | | |
| | | UTB-8 | | | | | | | | | 33 | | |
| | | UTB-9 | | | | | | | | | | 43 | |
| | | UTB-10 | | | | | | | | | | | 32 |
| Other monomers | | "ACMO" | 25 | 15 | 20 | 10 | 20 | 12 | 20 | 17 | 18 | 17 | 30 |
| | | "HEAA" | | 20 | 20 | | 15 | | 20 | | 10 | | 12 |
| | | "DMAA" | 23 | | | | 12 | 16 | | | | 14 | 15 |
| | | "DEAA" | | | | 20 | | | | 20 | | | |
| | | "DMAPAA" | | 10 | | | 8 | 9 | | 5 | | 3 | |
| | | HEA | 25 | | | 15 | | 15 | 15 | 5 | 19 | 3 | |
| | | THFA | 15 | | 15 | | | 20 | 15 | 28 | 20 | 20 | |
| | | IBOA | | 25 | 10 | | 25 | | | | | | 11 |
| Initiator | | Darocur 1173 | 3 | 3 | 3 | 3 | 3 | 3 | 3 | 3 | 3 | 3 | 3 |
| Polarizing plate characteristics | ACR | Surface shape observation | A | A | A | A | A | A | A | A | A | A | A |
| | | Peeling resistance | B | A | A | B | A | B | A | A | A | B | A |
| | | Water resistance | A | B | A | A | B | A | B | A | B | A | A |
| | | Durability | A | A | A | A | B | A | A | A | A | A | B |
| | COP | Surface shape observation | A | B | A | A | A | A | A | A | A | A | A |
| | | Peeling resistance | B | A | A | A | B | B | A | A | B | A | A |
| | | Water resistance | A | B | B | A | A | A | A | B | A | B | A |
| | | Durability | A | A | A | A | B | A | B | A | B | A | B |
| | TAC | Surface shape observation | A | A | A | A | A | A | A | A | A | A | A |
| | | Peeling resistance | A | B | B | A | A | B | A | B | A | A | A |
| | | Water resistance | B | B | B | A | B | A | B | A | B | A | B |
| | | Durability | A | A | A | A | B | A | A | A | A | B | A |

TABLE 11

| | | Evaluation Examples | | | | | | | | |
|---|---|---|---|---|---|---|---|---|---|---|
| | | E-12 | E-13 | E-14 | E-15 | E-16 | E-17 | E-18 | E-19 | E-20 |
| Urethane oligomer | UTC-1 | 11 | 45 | | | | | | 40 | |
| | UTC-2 | | | 55 | | | | | | |
| | UTC-3 | | | | 25 | | | | | |
| | UTC-4 | | | | | 35 | | | | |
| | UTC-5 | | | | | | 40 | | | |
| | UTC-6 | | | | | | | 25 | | |
| | UTC-7 | | | | | | | | | 28 |
| | UTB-1 | | | | | | | | 20 | |
| Other monomers | "ACMO" | 12 | 15 | 18 | 25 | 12 | 10 | 22 | 13 | 15 |
| | "HEAA" | 24 | 10 | 12 | | 10 | 10 | | 20 | |
| | "DMAA" | 33 | | | | | 15 | | | 12 |
| | "DEAA" | | | | 32 | | 20 | 33 | | 10 |
| | "DMAPAA" | | 10 | | | 8 | | | | 15 |
| | HEA | | | | 18 | | | 10 | | 20 |
| | THFA | 20 | | 8 | | | | | | |
| | IBOA | | 20 | 7 | | 20 | 20 | 10 | 7 | |

TABLE 11-continued

| | | | Evaluation Examples | | | | | | | | |
|---|---|---|---|---|---|---|---|---|---|---|---|
| | | | E-12 | E-13 | E-14 | E-15 | E-16 | E-17 | E-18 | E-19 | E-20 |
| Initiator | | Darocur 1173 | 3 | 3 | 3 | 3 | 3 | 3 | 3 | 3 | 3 |
| Polarizing plate characteristics | ACR | Surface shape observation | A | A | A | A | A | A | A | A | A |
| | | Peeling resistance | A | B | B | B | A | B | A | A | B |
| | | Water resistance | B | A | A | A | B | A | B | B | B |
| | | Durability | A | A | A | A | B | B | B | A | A |
| | COP | Surface shape observation | A | B | A | A | A | A | A | A | A |
| | | Peeling resistance | A | A | B | A | B | B | B | A | B |
| | | Water resistance | B | B | B | A | B | A | A | B | A |
| | | Durability | B | B | B | A | B | A | A | A | B |
| | TAC | Surface shape observation | A | A | A | A | A | A | A | A | A |
| | | Peeling resistance | A | B | B | A | A | B | A | B | A |
| | | Water resistance | B | B | B | B | B | A | B | A | B |
| | | Durability | A | A | A | A | B | A | B | A | A |

TABLE 12

| | | | Evaluation Comparative Examples | | | | | |
|---|---|---|---|---|---|---|---|---|
| | | | E-21 | E-22 | E-23 | E-24 | E-25 | E-26 |
| Urethane oligomer | | UAB-1 | 25 | | | | | |
| | | UAB-2 | | 12 | | | | |
| | | UAB-3 | | | 28 | | | |
| | | UAC-1 | | | | 25 | | |
| | | UAC-2 | | | | | 40 | |
| | | UAC-3 | | | | | | 32 |
| Other monomers | | "ACMO" | 35 | 30 | 15 | 28 | 17 | 14 |
| | | "HEAA" | 18 | 15 | | 18 | 10 | |
| | | "DMAA" | | 13 | 12 | | 15 | 12 |
| | | "DMAPAA" | 8 | | 15 | | | |
| | | HEA | | | 20 | | | 25 |
| | | THFA | | 20 | 25 | | 8 | 17 |
| | | IBOA | 14 | 10 | | 14 | 10 | |
| Initiator | | Darocur 1173 | 3 | 3 | 3 | 3 | 3 | 3 |
| Polarizing plate characteristics | ACR | Surface shape observation | A | B | B | C | B | C |
| | | Peeling resistance | C | D | C | D | C | D |
| | | Water resistance | D | C | B | D | C | D |
| | | Durability | B | C | C | B | C | D |
| | COP | Surface shape observation | C | C | B | C | B | A |
| | | Peeling resistance | D | C | D | D | C | D |
| | | Water resistance | D | D | C | D | B | D |
| | | Durability | B | D | D | D | C | D |
| | TAC | Surface shape observation | C | B | C | D | C | B |
| | | Peeling resistance | C | C | C | C | C | C |
| | | Water resistance | D | C | C | D | D | D |
| | | Durability | C | C | D | C | B | D |

As shown in the results of the evaluation examples and the evaluation comparative examples, in a urethane oligomer including more than 5% by weight of a low molecular weight component, the peeling resistance was reduced, and the low molecular weight component had a relatively high polarity, and thus, the water resistance and the durability of the obtained polarizing plate were insufficient. The polarizing plate obtained by the (meth)acrylamide-based urethane oligomer of the present invention did not have streaks or overall irregularity on the surface. In addition, it was possible to obtain an adhesive composition for polarizing plates having high peeling resistance, while having water resistance and durability.

Evaluation Example F-1

12 parts by weight of the (meth)acrylamide-based urethane oligomer UTB-1 synthesized in Synthesis Example 1, 35 parts by weight of HDDA, 27 parts by weight of THFA, 20 parts by weight of IBOA, 3 parts by weight of a pigment and 3 parts by weight of a pigment dispersing agent were mixed, then, 5 parts by weight of Darocur TPO as a photopolymerization initiator was added thereto, and the resulting product was homogeneously mixed, whereby a photocurable ink composition was prepared. Thereafter, ink jet printing was performed by the following method, and evaluation of the obtained printed matter was performed.

(29) Viscosity

The viscosity of the obtained ink composition was measured by using a cone-plate type viscometer (apparatus name: RE550 viscometer manufactured by Toki Sangyo Co., Ltd.) according to JIS K5600-2-3. Based on ink jet type printing, the viscosity of the ink composition at 20° C. is preferably 3 to 20 mPa·s, and more preferably 5 to 18 mPa·s. If the viscosity is less than 3 mPa·s, print bleeding after discharge and reduction of discharge followability by printing deviation are seen, and if the viscosity is more than 20 mPa·s, reduction of discharge stability due to clogging of discharge nozzles is seen, and thus, these are not preferable.

(30) Compatibility

The compatibility of the ink composition prepared by the above method was visually observed.

A: an insoluble material is not observed in the ink composition.

B: slight insoluble materials are observed in the ink composition.

C: insoluble materials are observed over the entire ink composition.

D: precipitate is observed in the ink composition.

Production of Printed Matter by UV Irradiation

The obtained ink composition was applied to a polyethylene terephthalate (PET) film having a thickness of 100 μm using a bar coater (RDS 12), and by irradiating with ultraviolet rays (apparatus: inverter type conveyor system ECS-4011GX manufactured by Eye Graphics Co., Ltd., metal halide lamp: M04-L41 manufactured by Eye Graphics Co., Ltd.), the ink composition was cured, whereby a printed matter was produced.

(31) Curability

When a printed matter was produced by the above method, the cumulative amount of light until the ink composition was completely cured was measured.

A: completely cure at 1,000 mJ/cm$^2$ or less

B: completely cure at more than 1,000 to 2,000 mJ/cm$^2$ or less

C: completely cure at more than 2,000 to 5,000 mJ/cm$^2$ or less

D: more than 5,000 mJ/cm$^2$ is required until completely cured

(32) Surface Drying Properties

After the printed matter was produced by the above method was allowed to stand in an environment of a temperature of 23° C. and a relative humidity of 50% for 5 minutes, high quality paper was superimposed on the printed surface, then, a load of 1 kg/cm$^2$ was applied thereto over a period of 1 minute, and the degree of transfer of ink to the paper was evaluated.

A: ink was dried, and transfer to the paper did not occur.

B: ink was dried, and transfer to the paper slightly occurred.

C: ink was nearly dried, and transfer to the paper occurred.

D: ink was hardly dried, and transfer to the paper significantly occurred.

Ink Jet Printing and Printability Evaluation

A solid image was printed using an ink jet type color printer (PM-A890 manufactured by Seiko Epson Corporation), and by performing irradiation (apparatus: inverter type conveyor system ECS-4011GX manufactured by Eye Graphics Co., Ltd., metal halide lamp: M04-L41 manufactured by Eye Graphics Co., Ltd., ultraviolet illumination: 700 mW/cm$^2$, cumulative amount of light: 1,000 mJ/cm$^2$) with ultraviolet rays, a printed matter was produced, and evaluation was performed on the printed matter by the following method. The results are shown in Table 13.

(33) Discharge Stability

Printing was performed using the ink jet printer described above, and the print state of the printed matter was visually evaluated.

A: there was no nozzle omission, and it was well printed.

B: there was slight nozzle omission.

C: there was nozzle omission over a wide range.

D: there was non-discharge.

(34) Sharpness

The sharpness of an image after printing was visually observed.

A: ink bleeding was not observed at all, and the image was clear.

B: ink bleeding was almost not observed, and the image was good.

C: ink bleeding was slightly observed.

D: ink bleeding was significantly observed.

(35) Water Resistance

The printed surface was exposed to flowing water for 1 minute, and the change in the image was visually observed.

A: the sharpness of the image was not changed at all.

B: although the sharpness of the image was almost not changed, ink bleeding was slightly observed.

C: the sharpness of the image was reduced, and ink bleeding was observed.

D: the sharpness of the image was significantly reduced, and ink bleeding was significantly observed.

Evaluation Examples F-2 to 20 and Evaluation Comparative Examples F-21 to 26

In the same manner as in Evaluation Example F-1 except that the compositions described in Table 13 to 15 were used, an ink composition was prepared, a printed matter was produced by the above method, and evaluation was performed thereon by the above method. The results are shown in Tables 13 and 15.

TABLE 13

| | | Evaluation Examples | | | | | | | | | | |
|---|---|---|---|---|---|---|---|---|---|---|---|---|
| | | F-1 | F-2 | F-3 | F-4 | F-5 | F-6 | F-7 | F-8 | F-9 | F-10 | F-11 |
| Urethane oligomer | UTB-1 | 12 | 25 | | | | | | | | | |
| | UTB-2 | | | 20 | | | | | | | | |
| | UTB-3 | | | | 7 | | | | | | | |
| | UTB-4 | | | | | 9 | | | | | | |
| | UTB-5 | | | | | | 30 | | | | | |
| | UTB-6 | | | | | | | 20 | | | | |
| | UTB-7 | | | | | | | | 6 | | | |
| | UTB-8 | | | | | | | | | 14 | | |
| | UTB-9 | | | | | | | | | | 7 | |
| | UTB-10 | | | | | | | | | | | 30 |

TABLE 13-continued

|  |  | Evaluation Examples |  |  |  |  |  |  |  |  |  |  |
|---|---|---|---|---|---|---|---|---|---|---|---|---|
|  |  | F-1 | F-2 | F-3 | F-4 | F-5 | F-6 | F-7 | F-8 | F-9 | F-10 | F-11 |
| Polyfunctional | HDDA | 35 | 32 |  | 10 |  | 22 |  | 30 | 5 | 10 | 12 |
| acrylate | TPGDA |  |  | 15 | 20 | 30 | 12 | 10 | 8 | 18 | 15 | 10 |
| Other | "DEAA" |  | 22 | 26 | 27 | 40 | 30 | 40 | 35 | 35 | 32 | 12 |
| monomers | THFA | 27 | 15 | 33 | 30 | 15 |  | 14 |  | 22 | 30 | 20 |
|  | IBOA | 20 |  |  |  |  | 10 | 15 |  |  |  | 10 |
| Pigment |  | 3 | 3 | 3 | 3 | 3 | 3 | 3 | 3 | 3 | 3 | 3 |
| Pigment dispersing agent |  | 3 | 3 | 3 | 3 | 3 | 3 | 3 | 3 | 3 | 3 | 3 |
| Initiator | Darocur TPO | 5 | 5 | 5 | 5 | 5 | 5 | 5 | 5 | 5 | 5 | 5 |
| Printed | Viscosity (mPa · s) | 18 | 10 | 15 | 17 | 18 | 8 | 18 | 17 | 13 | 14 | 12 |
| matter | Compatibility | A | A | A | A | A | A | A | A | A | A | A |
| characteristics | Curability | A | A | A | A | B | A | A | A | A | A | A |
|  | Surface drying properties | A | A | A | A | A | A | A | A | A | A | A |
|  | Discharge stability | A | A | A | A | A | A | A | A | A | A | A |
|  | Sharpness | A | A | A | A | A | B | A | A | A | A | A |
|  | Water resistance | B | A | A | A | B | A | A | A | A | A | A |

TABLE 14

|  |  | Evaluation Examples |  |  |  |  |  |  |  |  |
|---|---|---|---|---|---|---|---|---|---|---|
|  |  | F-12 | F-13 | F-14 | F-15 | F-16 | F-17 | F-18 | F-19 | F-20 |
| Urethane | UTC-1 | 8 | 25 |  |  |  |  |  | 26 |  |
| oligomer | UTC-2 |  |  | 28 |  |  |  |  |  |  |
|  | UTC-3 |  |  |  | 13 |  |  |  |  |  |
|  | UTC-4 |  |  |  |  | 32 |  |  |  |  |
|  | UTC-5 |  |  |  |  |  | 15 |  |  |  |
|  | UTC-6 |  |  |  |  |  |  | 20 |  |  |
|  | UTC-7 |  |  |  |  |  |  |  |  | 9 |
|  | UTB-1 |  |  |  |  |  |  |  | 11 |  |
| Polyfunctional | HDDA | 25 | 28 |  | 10 |  | 30 | 15 |  | 20 |
| acrylate | TPGDA | 17 |  | 8 | 14 | 25 |  | 15 | 30 | 16 |
| Other | "DEAA" |  | 27 | 26 | 25 | 12 | 25 | 24 | 8 | 24 |
| monomers | THFA | 24 |  | 32 | 32 | 25 |  | 13 | 19 | 25 |
|  | IBOA | 20 | 14 |  |  |  | 11 | 20 |  |  |
| Pigment |  | 3 | 3 | 3 | 3 | 3 | 3 | 3 | 3 | 3 |
| Pigment dispersing agent |  | 3 | 3 | 3 | 3 | 3 | 3 | 3 | 3 | 3 |
| Initiator | Darocur TPO | 5 | 5 | 5 | 5 | 5 | 5 | 5 | 5 | 5 |
| Printed | Viscosity (mPa · s) | 15 | 18 | 13 | 16 | 12 | 13 | 14 | 13 | 13 |
| matter | Compatibility | A | A | A | A | A | A | A | A | A |
| characteristics | Curability | A | A | A | A | A | A | A | A | A |
|  | Surface drying properties | A | A | A | A | A | A | A | A | A |
|  | Discharge stability | A | A | A | A | A | A | A | A | A |
|  | Sharpness | A | A | A | A | A | A | A | A | B |
|  | Water resistance | B | A | A | A | B | A | B | A | A |

TABLE 15

|  |  | Evaluation Comparative Examples |  |  |  |  |  |
|---|---|---|---|---|---|---|---|
|  |  | F-21 | F-22 | F-23 | F-24 | F-25 | F-26 |
| Urethane | UAB-1 | 25 |  |  |  |  |  |
| oligomer | UAB-2 |  | 12 |  |  |  |  |
|  | UAB-3 |  |  | 9 |  |  |  |
|  | UAC-1 |  |  |  | 25 |  |  |
|  | UAC-2 |  |  |  |  | 12 |  |
|  | UAC-3 |  |  |  |  |  | 9 |
| Polyfunctional | HDDA | 13 |  | 10 | 13 | 10 | 10 |
| acrylate | TPGDA |  | 30 | 21 |  | 14 | 18 |
| Other | "DEAA" | 35 | 46 | 24 | 26 | 26 | 24 |
| monomers | THFA | 6 |  | 30 | 18 | 32 | 33 |
|  | IBOA | 15 | 6 |  | 12 |  |  |
| Pigment |  | 3 | 3 | 3 | 3 | 3 | 3 |
| Pigment dispersing agent |  | 3 | 3 | 3 | 3 | 3 | 3 |
| Initiator | Darocur TPO | 5 | 5 | 5 | 5 | 5 | 5 |

TABLE 15-continued

|  |  | Evaluation Comparative Examples | | | | | |
| --- | --- | --- | --- | --- | --- | --- | --- |
|  |  | F-21 | F-22 | F-23 | F-24 | F-25 | F-26 |
| Printed matter characteristics | Viscosity (mPa · s) | 23 | 28 | 25 | 32 | 23 | 28 |
|  | Compatibility | B | C | B | C | B | C |
|  | Curability | B | C | D | C | B | D |
|  | Surface drying properties | B | C | C | D | B | C |
|  | Discharge stability | C | D | B | D | C | C |
|  | Sharpness | B | D | B | C | C | C |
|  | Water resistance | D | D | B | D | D | C |

As shown in the results of the evaluation examples and the evaluation comparative examples, it was found that in a urethane oligomer including more than 5% by weight of a low molecular weight component, the curability and the surface drying properties were poor, and in a printed matter after discharging by a low molecular weight component having high polarity and curing, the water resistance was poor. In the (meth)acrylamide-based urethane oligomer obtained in the present invention, it was possible to obtain an excellent ink composition which has excellent curability and surface drying properties, and has discharge stability, sharpness and water resistance.

Evaluation Example G-1

40 parts by weight of the (meth)acrylamide-based urethane oligomer UTB-1 synthesized in Synthesis Example 1, 25 parts by weight of UV-1700, 20 parts by weight of DPHA and 15 parts by weight of ACMO were mixed, then, 3 parts by weight of Darocur 1173 as a photopolymerization initiator was added thereto, and the resulting product was homogeneously mixed, whereby a photocurable coating agent composition was prepared.

(36) Compatibility

The compatibility of the coating agent composition obtained by the above method was visually observed.

A: transparency of the coating agent composition is high, and cloudiness or separation is not observed at all.

B: although transparency of the coating agent composition is high, cloudiness is slightly observed.

C: cloudiness is observed over the entire coating agent composition.

D: cloudiness of the coating agent composition is observed, and separation occurs.

(37) Wettability

The obtained coating agent composition was applied to a substrate, and the adhered state of the coating film was visually observed.

A: even immediately after applying, even after being allowed to stand for 5 minutes, without cissing, a smooth coating film was formed.

B: there was no cissing immediately after application, but after being allowed to stand for 5 minutes, cissing was slightly observed.

C: cissing was slightly observed immediately after application.

D: cissing was significantly observed immediately after application, and a uniform coating film was not obtained.

Production of Coat Film by UV Irradiation

The obtained coating agent composition was applied to a PET film having a thickness of 100 μm using a bar coater (No. RDS 0 and RDS 12), and coating films were produced such that the thickness of the dried coating film became 1 μm (RDS 0) and 10 μm (RDS 12) respectively. By performing irradiation (apparatus: inverter type conveyor system ECS-4011GX manufactured by Eye Graphics Co., Ltd., metal halide lamp: M04-L41 manufactured by Eye Graphics Co., Ltd., ultraviolet illumination: 700 mW/cm$^2$, cumulative amount of light: 1,000 mJ/cm$^2$) with ultraviolet rays, a coat film was produced, and evaluation was performed on the coat film by the following method. The results are shown in Table 16. In a case where a solvent was used, ultraviolet rays irradiation was performed after drying at 80° C. for 3 minutes after coating.

(38) Curability

The coating agent composition was applied, then, the obtained coating film was irradiated with ultraviolet rays of ultraviolet ray illumination of 700 mW/cm$^2$, and the cumulative amount of light until the resin composition was completely cured was measured.

The complete cure means a state in which when the surface of the cured film is rubbed with silicon rubber, there is no trace.

A: completely cures in a cumulative amount of light of 1,000 mJ/cm$^2$ or less.

B: completely cures in a cumulative amount of light of more than 1,000 mJ/cm$^2$ to 2,000 mJ/cm$^2$ or less.

C: completely cures in a cumulative amount of light of more than 2,000 mJ/cm$^2$ to 5,000 mJ/cm$^2$ or less.

D: a cumulative amount of light of more than 5,000 mJ/cm$^2$ is required until completely cured.

(39) Tack Resistance

The surface of the coat film obtained by the above method was touched with a finger, and the degree of stickiness was evaluated.

A: there is no stickiness.

B: although there is slight stickiness, trace of a finger does not remain on the surface.

C: there is stickiness, and trace of a finger remains on the surface.

D: stickiness is severe, and a finger sticks to the surface.

(40) Shrinkage Resistance

A coat film obtained by irradiating the coating film obtained by the above method with ultraviolet rays (ultraviolet illumination of 700 mW/cm$^2$, cumulative amount of light of 2,000 mJ/cm$^2$) was cut into 10 cm square, and the average of lifting up of the four corners were measured.

A: lifting up was 0.5 mm or less

B: lifting up was more than 0.5 and 1 mm or less

C: lifting up was more than 1 mm and 3 mm or less

D: lifting up was more than 3 mm and significantly curled

(41) Abrasion Resistance

Steel wool of #0000 was reciprocatively moved ten times while a load of 200 g/cm$^2$ was applied, and the presence of an occurrence of scratches was visually evaluated.

A: peeling of a film and occurrence of scratches are hardly observed.

B: fine scratches are slightly observed on a part of a film.

C: streaky scratches are observed on the entire film surface.

D: peeling of a film occurs.

(42) Self-Restoring Properties

The coat film obtained by the above method was scratched using a spoon and allowed to stand in an environment of a temperature of 25° C. and a relative humidity of 50%, and the recovery state from scratches was visually evaluated.

A: scratches are completely recovered within 30 minutes.
B: scratches are completely recovered within 30 minutes to 5 hours.
C: scratches are completely recovered within 5 hours to 24 hours.
D: scratches are not completely recovered even after being allowed to stand for 24 hours.

(43) Adhesion

According to JIS K 5600, one hundred of squares of 1 mm×1 mm were manufactured, then, a cellophane tape was attached thereto, and evaluation was performed by counting the number of squares in which the coating film remained on the substrate side when the tape was peeled at once.

(44) Moisture Resistance

The coat film obtained on a PET film (100 μm) was allowed to stand in an environment of a temperature of 50° C. and a relative humidity of 95% for 24 hours, and the subsequent film was evaluated visually or by an adhesion test.

A: transparency is maintained at high temperature and high humidity, and deterioration of adhesion is not observed.
B: although transparency is maintained at high temperature and high humidity, slight deterioration of adhesion is observed.
C: although transparency is maintained at high temperature and high humidity, significant deterioration of adhesion is observed.
D: deterioration of transparency at high temperature and high humidity and deterioration of adhesion are observed.

Evaluation Examples G-2 to 22 and Evaluation Comparative Examples G-23 to 28

In the same manner as in Evaluation Example G-1 except that the compositions described in Tables 16 to 18 were used, a coating agent composition was prepared, a cured film was produced by the above method, and evaluation was performed thereon by the above method. The results are shown in Tables 16 to 18.

TABLE 16

|  |  | Evaluation Examples | | | | | | | | | | | |
|---|---|---|---|---|---|---|---|---|---|---|---|---|
|  |  | G-1 | G-2 | G-3 | G-4 | G-5 | G-6 | G-7 | G-8 | G-9 | G-10 | G-11 | G-12 |
| Urethane oligomer | UTB-1 | 40 | 15 |  |  |  |  |  |  |  |  |  |  |
|  | UTB-2 |  |  | 40 | 12 |  |  |  |  |  |  |  |  |
|  | UTB-3 |  |  |  |  | 10 |  |  |  |  |  |  |  |
|  | UTB-4 |  |  |  |  |  | 15 |  |  |  |  |  |  |
|  | UTB-5 |  | 35 |  | 55 | 22 | 20 | 78 | 10 | 32 | 27 | 50 |  |
|  | UTB-6 |  |  |  |  |  |  |  | 50 |  |  |  |  |
|  | UTB-7 |  |  |  |  |  |  |  |  | 15 |  |  |  |
|  | UTB-8 |  |  |  |  |  |  |  |  |  | 20 |  |  |
|  | UTB-9 |  |  |  |  |  |  |  |  |  |  | 10 |  |
|  | UTB-10 |  |  |  |  |  |  |  |  |  |  |  | 55 |
| Polyfunctional acrylate | UV-1700 | 25 |  |  |  | 28 | 28 |  |  | 12 | 13 |  |  |
|  | UV-7600 |  | 15 | 32 |  |  |  |  |  |  |  |  | 17 |
|  | PETA |  | 15 |  | 10 |  |  |  |  | 5 | 8 | 20 | 8 |
|  | DPHA | 20 |  | 13 |  | 20 | 14 | 5 | 15 |  | 5 |  |  |
| Other monomers | "ACMO" | 15 |  | 7 |  | 12 | 13 | 7 | 13 | 6 |  | 8 | 10 |
|  | "DEAA" |  | 20 |  | 23 |  |  |  |  |  | 10 |  |  |
|  | THFA |  |  |  |  |  |  | 10 |  |  |  |  | 10 |
|  | IBOA |  |  | 8 |  | 8 | 10 |  | 12 | 30 | 17 | 12 |  |
| Solvent | MEK |  |  |  |  | 20 | 15 |  |  |  |  | 20 |  |
| Initiator | Darocur 1173 | 3 | 3 | 3 | 3 | 3 | 3 | 3 | 3 | 3 | 3 | 3 | 3 |
| Compatibility |  | A | A | A | A | A | A | A | A | A | A | A | A |
| Wettability | PET (readily adhesive) | A | A | A | A | A | A | A | A | A | A | A | A |
|  | PET (untreated) | A | A | A | A | B | B | A | A | A | A | A | A |
|  | PC | A | A | A | A | A | A | A | A | A | A | A | A |
|  | PMMA | A | A | A | A | A | B | B | A | A | A | A | A |
| Curability | Film thickness 1 μm | A | A | A | A | B | B | A | A | B | A | A | B |
|  | Film thickness 10 μm | A | A | A | A | B | B | A | A | A | A | A | A |
| Coat film characteristics | Tack resistance | A | A | B | B | B | B | A | A | A | A | B | A |
|  | Shrinkage resistance | A | A | A | A | A | A | A | A | A | A | A | A |
|  | Abrasion resistance | A | A | A | A | B | B | A | A | B | B | B | A |
|  | Self-restoring properties | A | A | B | A | A | A | B | B | A | A | A | B |
|  | Adhesion Glass | 100/100 | 100/100 | 90/100 | 100/100 | 90/100 | 80/100 | 100/100 | 90/100 | 80/100 | 100/100 | 90/100 | 100/100 |
|  | PET (readily adhesive) | 100/100 | 100/100 | 100/100 | 100/100 | 100/100 | 100/100 | 100/100 | 100/100 | 100/100 | 100/100 | 100/100 | 100/100 |
|  | PET (untreated) | 100/100 | 100/100 | 100/100 | 100/100 | 100/100 | 100/100 | 100/100 | 100/100 | 100/100 | 100/100 | 100/100 | 100/100 |
|  | PC | 50/100 | 60/100 | 80/100 | 50/100 | 70/100 | 50/100 | 80/100 | 80/100 | 90/100 | 60/100 | 80/100 | 80/100 |
|  | PMMA | 100/100 | 100/100 | 100/100 | 100/100 | 100/100 | 100/100 | 90/100 | 100/100 | 100/100 | 100/100 | 100/100 | 100/100 |

TABLE 16-continued

|  |  | Evaluation Examples | | | | | | | | | | | |
|---|---|---|---|---|---|---|---|---|---|---|---|---|
|  |  | G-1 | G-2 | G-3 | G-4 | G-5 | G-6 | G-7 | G-8 | G-9 | G-10 | G-11 | G-12 |
|  | ABS | 50/100 | 70/100 | 50/100 | 80/100 | 50/100 | 60/100 | 80/100 | 80/100 | 100/100 | 90/100 | 70/100 | 60/100 |
|  | Metal (copper) | 60/100 | 100/100 | 70/100 | 100/100 | 50/100 | 60/100 | 80/100 | 80/100 | 60/100 | 100/100 | 70/100 | 80/100 |
| Moisture resistance |  | B | A | A | B | A | B | A | A | A | A | B | A |

TABLE 17

|  |  | Evaluation Examples | | | | | | | | | |
|---|---|---|---|---|---|---|---|---|---|---|---|
|  |  | G-13 | G-14 | G-15 | G-16 | G-17 | G-18 | G-19 | G-20 | G-21 | G-22 |
| Urethane oligomer | UTC-1 | 24 | 12 |  |  |  |  |  | 40 |  |  |
|  | UTC-2 |  |  | 45 | 15 |  |  |  |  |  |  |
|  | UTC-3 |  |  |  |  | 10 |  |  |  |  |  |
|  | UTC-4 |  | 32 |  | 48 | 22 | 65 | 26 | 5 | 40 | 23 |
|  | UTC-5 |  |  |  |  |  |  |  |  |  |  |
|  | UTC-6 |  |  |  |  |  |  | 14 |  | 30 |  |
|  | UTC-7 |  |  |  |  |  |  |  |  |  | 15 |
|  | UTB-1 |  |  |  |  |  |  |  | 15 |  |  |
| Polyfunctional acrylate | UV-1700 | 40 |  | 20 |  | 32 |  | 15 | 8 |  |  |
|  | UV-7600 |  | 15 |  |  |  |  |  |  |  | 25 |
|  | PETA |  | 8 |  | 11 |  | 15 | 13 | 10 |  |  |
|  | DPHA | 16 |  | 13 |  | 15 | 12 |  |  |  | 15 |
| Other monomers | "ACMO" | 20 |  | 15 |  | 6 | 15 | 15 | 12 | 10 | 7 |
|  | "DEAA" |  | 18 |  | 16 |  | 8 | 5 |  | 10 |  |
|  | THFA |  |  |  | 10 |  |  |  | 7 |  | 15 |
|  | IBOA |  | 15 | 7 |  | 15 |  | 10 |  |  |  |
| Solvent | MEK |  |  |  |  | 20 | 15 |  |  |  |  |
| Initiator | Darocur 1173 | 3 | 3 | 3 | 3 | 3 | 3 | 3 | 3 | 3 | 3 |
| Compatibility |  | A | A | A | A | A | A | A | A | A | A |
| Wettability | PET (readily adhesive) | A | A | A | A | A | A | A | A | A | A |
|  | PET (untreated) | A | A | A | A | A | A | A | A | A | A |
|  | PC | A | A | A | A | A | A | A | A | A | A |
|  | PMMA | A | A | A | A | A | B | A | A | A | B |
| Curability | Film thickness 1 μm | A | A | B | A | B | A | A | A | B | B |
|  | Film thickness 10 μm | A | A | A | A | B | B | A | A | A | A |
| Coat film characteristics | Tack resistance | A | A | B | B | B | B | B | A | A | A |
|  | Shrinkage resistance | A | A | B | A | A | A | A | A | A | A |
|  | Abrasion resistance | A | A | A | A | B | B | A | A | A | A |
|  | Self-restoring properties | A | A | B | A | A | A | A | A | A | B |
|  | Adhesion Glass | 100/100 | 100/100 | 80/100 | 100/100 | 90/100 | 100/100 | 100/100 | 90/100 | 100/100 | 90/100 |
|  | PET (readily adhesive) | 100/100 | 100/100 | 100/100 | 100/100 | 100/100 | 100/100 | 100/100 | 100/100 | 100/100 | 100/100 |
|  | PET (untreated) | 80/100 | 90/100 | 100/100 | 100/100 | 90/100 | 90/100 | 80/100 | 80/100 | 100/100 | 100/100 |
|  | PC | 100/100 | 100/100 | 100/100 | 100/100 | 100/100 | 100/100 | 100/100 | 80/100 | 100/100 | 100/100 |
|  | PMMA | 100/100 | 90/100 | 100/100 | 90/100 | 100/100 | 80/100 | 100/100 | 100/100 | 100/100 | 50/100 |
|  | ABS | 70/100 | 80/100 | 90/100 | 80/100 | 70/100 | 90/100 | 70/100 | 100/100 | 100/100 | 80/100 |
|  | Metal (copper) | 70/100 | 100/100 | 60/100 | 100/100 | 50/100 | 90/100 | 80/100 | 80/100 | 60/100 | 100/100 |
| Moisture resistance |  | A | A | A | A | A | A | A | A | A | A |

TABLE 18

|  |  | Evaluation Comparative Examples | | | | | |
|---|---|---|---|---|---|---|---|
|  |  | G-23 | G-24 | G-25 | G-26 | G-27 | G-28 |
| Urethane oligomer | UAB-1 | 40 |  |  | 8 |  |  |
|  | UAB-2 |  | 35 |  |  |  |  |
|  | UAB-3 |  |  | 13 |  |  |  |
|  | UAC-1 |  |  |  | 25 |  |  |
|  | UAC-2 |  |  |  |  | 20 |  |
|  | UAC-3 |  |  |  |  |  | 33 |
| Polyfunctional acrylate | UV-1700 | 25 | 25 |  | 32 | 28 |  |
|  | UV-7600 |  |  | 40 |  | 13 | 35 |
|  | PETA | 12 |  |  | 13 |  | 15 |
|  | DPHA |  | 17 | 18 |  | 18 |  |
| Other monomers | "ACMO" | 15 |  | 15 | 12 |  | 12 |
|  | "DMAA" |  | 13 |  |  | 13 |  |
|  | THFA | 8 |  | 14 | 10 |  | 5 |
|  | IBOA |  | 10 |  |  | 8 |  |
| Initiator | Darocur 1173 | 3 | 3 | 3 | 3 | 3 | 3 |
| Compatibility |  | B | C | B | C | B | B |
| Wettability | PET (readily adhesive) | A | A | B | A | B | B |
|  | PET (untreated) | B | C | B | C | D | C |
|  | PC | A | B | B | A | B | B |
|  | PMMA | C | B | B | C | B | D |
| Curability | Film thickness 1 μm | D | D | D | D | D | D |
|  | Film thickness 10 μm | C | B | D | C | B | D |
| Coat film characteristics | Tack resistance | D | D | C | D | D | D |
|  | Shrinkage resistance | C | C | B | C | C | C |
|  | Abrasion resistance | C | D | C | C | D | C |
|  | Self-restoring properties | B | C | B | B | C | D |
|  | Adhesion Glass | 40/100 | 30/100 | 20/100 | 10/100 | 20/100 | 20/100 |
|  | PET (readily adhesive) | 90/100 | 80/100 | 100/100 | 90/100 | 80/100 | 90/100 |
|  | PET (untreated) | 0/100 | 0/100 | 95/100 | 0/100 | 0/100 | 0/100 |
|  | PC | 20/100 | 10/100 | 50/100 | 80/100 | 90/100 | 70/100 |
|  | PMMA | 0/100 | 0/100 | 90/100 | 0/100 | 0/100 | 0/100 |
|  | ABS | 10/100 | 0/100 | 20/100 | 0/100 | 0/100 | 30/100 |
|  | Metal (copper) | 0/100 | 0/100 | 0/100 | 0/100 | 0/100 | 0/100 |
|  | Moisture resistance | C | B | B | C | D | C |

As shown in the results of the evaluation examples and the evaluation comparative examples, in (meth)acrylamide-based urethane oligomer including more than 5% by weight of a low molecular weight component, the curability and the tack resistance were poor, the polarity of a coating agent composition was increased by containing a low molecular weight component having high polarity, the adhesion to a PET untreated surface, PC, PMMA, particularly glass, or a metal and the moisture resistance tended to deteriorate. In the (meth)acrylamide-based urethane oligomer of the present invention, it was possible to obtain a coating agent composition which has excellent curability, and exhibits good results in moisture resistance, adhesion and tack resistance.

INDUSTRIAL APPLICABILITY

As described above, the (meth)acrylamide-based urethane oligomer of the present invention has a diene-based skeleton or a hydrogenated diene-based skeleton in the molecule and one or more (meth)acrylamide groups, and the oligomer has a low molecular weight component having a molecular weight of less than 1,000 at a content of 5% by weight or less, and thus, the (meth)acrylamide-based urethane oligomer of the present invention has excellent compatibility with general-purpose organic solvents and monomers and exhibits a high curing speed when irradiated with active energy rays. By using the (meth)acrylamide-based urethane oligomer of the present invention, it is possible to produce a cured film without stickiness, having high shrinkage resistance and high moisture and heat resistance. Furthermore, by using a monofunctional monomer, a polyfunctional monomer, an ionic monomer, an active energy ray polymerization initiator and a pigment in combination as necessary, it is possible to suitably use in adhesives, electronic materials, inks, coating agents and photocurable type resist application.

The invention claimed is:

1. A (meth)acrylamide-based urethane oligomer, which has:
    one type or two or more types of skeletons selected from the group consisting of a carbonate skeleton, a diene-based skeleton and a hydrogenated diene-based skeleton in the molecule; a glass transition temperature (Tg) of −50° C. to 80° C.; and one or more (meth)acrylamide groups on the terminal, the oligomer containing 5% by weight or less of components, excluding a (meth)acrylamide compound (A) having a hydroxyl group,
    having a molecular weight of less than 1,000.

2. The (meth)acrylamide-based urethane oligomer according to claim 1, wherein the component having a molecular weight of less than 1,000, excluding a (meth)acrylamide compound (A) having a hydroxyl group, is a urethane adduct compound obtainable by an addition reaction between an isocyanate monomer (B) having two or more isocyanate groups in one molecule and the (meth)acrylamide compound (A) having a hydroxyl group.

3. The (meth)acrylamide-based urethane oligomer according to claim 1,
wherein the diene-based skeleton or the hydrogenated diene-based skeleton is one or more types of skeletons selected from the group consisting of polybutadiene, hydrogenated products of polybutadiene, polyisoprene and hydrogenated products of polyisoprene.

4. The (meth)acrylamide-based urethane oligomer according to claim 1, which is obtainable by an addition reaction between a compound (A) represented by Formula [1] ($R_1$ represents a hydrogen atom or a methyl group, $R_2$ and $R_3$ are the same as or different from each other and each represent a hydrogen atom or an alkyl group having 1 to 3 carbon atoms which may be substituted with a hydroxyl group, provided that a case where $R_2$ and $R_3$ are hydrogen atoms at the same time and a case where $R_2$ and $R_3$ are alkyl groups at the same time are excluded) and a compound (C) having one or more isocyanate groups and one or two or more types of skeletons selected from a group consisting of a polycarbonate skeleton, a polybutadiene skeleton, a hydrogenated polybutadiene skeleton, a polyisoprene skeleton and a hydrogenated polyisoprene skeleton in one molecule:

[Chem. 1]

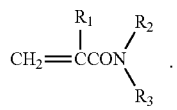

Formula (I)

5. The (meth)acrylamide-based urethane oligomer according to claim 1,
wherein the compound (A) is an N-hydroxyalkylene (meth)acrylamide, an N,N-dihydroxyalkylene (meth)acrylamide or an N-alkyl-N-hydroxyalkylene (meth)acrylamide.

6. An active energy ray curable resin composition, comprising:
the (meth)acrylamide-based urethane oligomer according to claim 1.

7. An active energy ray curable pressure sensitive adhesive composition for optical materials, comprising:
1% by weight or greater of the (meth)acrylamide-based urethane oligomer according to claim 1.

8. An active energy ray curable adhesive composition, comprising:
1% by weight or greater of the (meth)acrylamide-based urethane oligomer according to claim 1.

9. An active energy ray curable adhesive composition for optical members, comprising:
1% by weight or greater of the (meth)acrylamide-based urethane oligomer according to claim 1.

10. An active energy ray curable adhesive composition for polarizing plates, comprising:
1% by weight or greater of the (meth)acrylamide-based urethane oligomer according to claim 1.

11. An active energy ray curable sealant composition for electronic parts, comprising:
1% by weight or greater of the (meth)acrylamide-based urethane oligomer according to claim 1.

12. An active energy ray curable coating agent composition, comprising:
1% by weight or greater of the (meth)acrylamide-based urethane oligomer according to claim 1.

13. An active energy ray curable ink jet ink composition, comprising:
1% by weight or greater of the (meth)acrylamide-based urethane oligomer according to claim 1.

14. An active energy ray curable resin composition for three-dimensional modeling, comprising:
1% by weight or greater of the (meth)acrylamide-based urethane oligomer according to claim 1.

* * * * *